(12) United States Patent
Donahue

(10) Patent No.: US 8,085,774 B2
(45) Date of Patent: Dec. 27, 2011

(54) SYSTEM AND METHOD FOR CONTENT FILTERING USING STATIC SOURCE ROUTES

(75) Inventor: David B. Donahue, Mountain View, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 526 days.

(21) Appl. No.: 11/490,685

(22) Filed: Jul. 21, 2006

(65) Prior Publication Data

US 2006/0256788 A1     Nov. 16, 2006

Related U.S. Application Data

(63) Continuation of application No. 10/295,476, filed on Nov. 15, 2002, now Pat. No. 7,149,219, which is a continuation-in-part of application No. 10/040,773, filed on Dec. 28, 2001.

(51) Int. Cl.
*H04L 12/56* (2006.01)
*G06F 15/173* (2006.01)
*G06F 9/00* (2006.01)

(52) U.S. Cl. ............. 370/392; 709/225; 726/12; 726/13
(58) Field of Classification Search .................. 709/225, 709/229; 726/4, 7, 13, 30
See application file for complete search history.

(56) References Cited

U.S. PATENT DOCUMENTS

| | | | |
|---|---|---|---|
| 5,696,898 A | 12/1997 | Baker et al. | |
| 5,706,507 A | 1/1998 | Schloss | |
| 5,809,144 A | 9/1998 | Sirbu et al. | |
| 5,848,418 A | 12/1998 | De Souza et al. | |
| 5,884,033 A | 3/1999 | Duvall et al. | |
| 5,903,732 A | 5/1999 | Reed et al. | |
| 5,937,404 A | 8/1999 | Csaszar et al. | |
| 5,987,606 A * | 11/1999 | Cirasole et al. | 726/11 |
| 5,987,611 A | 11/1999 | Freund | |
| 5,991,810 A * | 11/1999 | Shapiro et al. | 709/229 |
| 5,996,011 A * | 11/1999 | Humes | 709/225 |
| 6,037,934 A | 3/2000 | Himmel et al. | |
| 6,041,360 A | 3/2000 | Himmel et al. | |
| 6,065,055 A * | 5/2000 | Hughes et al. | 709/229 |
| 6,092,110 A | 7/2000 | Maria et al. | |
| 6,233,618 B1 | 5/2001 | Shannon | |
| 6,237,092 B1 * | 5/2001 | Hayes, Jr. | 713/100 |
| 6,256,671 B1 | 7/2001 | Strentzsch et al. | |

(Continued)

OTHER PUBLICATIONS

Rigney, Steve; "Surveying the Wave"; PC Magazine; May 6, 1997; vol. 16, p. 9.

*Primary Examiner* — Dang Ton
*Assistant Examiner* — Ryan Kavleski

(57) ABSTRACT

A packet containing a request for content is initially received at a content filtering router. The packet comprises a destination Internet Protocol (IP) address of a content server that stores the content and a bogus IP address. It is ascertained that the destination IP address is on a list of approved destination IP address. Alternatively, it is ascertained that the destination IP address is on a list of probably unapproved destination IP addresses and the packet is routed in accordance with an alternative IP address to a content filtering server. In this alternative, at the content filtering server the bogus IP address is used to determine a content filtering category and it is ascertained whether the destination IP address with the content filtering category should be filtered based upon a list of IP addresses and associated content filtering categories.

13 Claims, 19 Drawing Sheets

U.S. PATENT DOCUMENTS

| | | |
|---|---|---|
| 6,564,327 B1 * | 5/2003 | Klensin et al. ............... 726/7 |
| 6,675,162 B1 * | 1/2004 | Russell-Falla et al. ........... 707/5 |
| 6,711,687 B1 * | 3/2004 | Sekiguchi ................. 726/23 |
| 7,302,488 B2 * | 11/2007 | Mathew et al. ............. 709/229 |
| 7,340,518 B1 * | 3/2008 | Jenkins ................... 709/225 |
| 2002/0032870 A1 | 3/2002 | Spusta |
| 2002/0059451 A1 | 5/2002 | Haviv |
| 2002/0112171 A1 * | 8/2002 | Ginter et al. ............... 713/185 |
| 2002/0169865 A1 * | 11/2002 | Tarnoff .................... 709/223 |
| 2003/0009495 A1 * | 1/2003 | Adjaoute ................. 707/501.1 |
| 2003/0093518 A1 | 5/2003 | Hiraga |
| 2003/0182573 A1 * | 9/2003 | Toneguzzo et al. ........... 713/201 |
| 2004/0006621 A1 * | 1/2004 | Bellinson et al. ............ 709/225 |
| 2005/0065935 A1 * | 3/2005 | Chebolu et al. ................ 707/9 |
| 2007/0157293 A1 * | 7/2007 | Shuster ..................... 726/4 |

* cited by examiner (IP Device)

(Filtering Router)

(Filtering Server)

SYSTEM AND METHOD FOR CONTENT FILTERING USING STATIC SOURCE ROUTES

CROSS-REFERENCE TO RELATED APPLICATIONS

The present application is a Continuation of U.S. patent application Ser. No. 10/295,476 filed Nov. 15, 2002 now U.S. Pat. No. 7,149,219, which is a Continuation-In-Part Application of U.S. patent application Ser. No. 10/040,773 filed on Dec. 28, 2001, which is incorporated by reference herein.

BACKGROUND OF THE INVENTION

1. Field of the Invention

The invention relates to a content filtering system and more particularly to a system and method for controlling user access to a computer network using a content filtering router that filters requests for content by routing them based on their final destination addresses.

2. Description of the Related Art

The Internet is a loose network of networked computers spread throughout the world. Many of these networked computers serve content, such as Web pages, that are publicly accessible. This content is typically located through Internet addresses, such as www.company.com/info, which usually consist of the access protocol or scheme, such as HyperText Transport Protocol (http), the domain name (www.company.com), and optionally the path to a file or resource residing on that server (info). This Internet address is also known as a Uniform Resource Locator (URL). A Domain Name System (DNS) is then used to convert the domain name of a specific computer on the network into a corresponding unique Internet Protocol (IP) address, such as 204,171.64.2.

Typically, users access content in one of two ways. The first way is for the user to click on a Hyperlink. The Hyperlink links a displayed object, such as text or an icon, to a file addressed by a URL. The second way is for the user to enter a URL into a text or address box on an application layer such as a Graphical User Interface (GUI) of a file manager or an Internet browser, such as MICROSOFT'S INTERNET EXPLORER™, and click "Go" or press "Enter." An application layer is like high-level set-up services for the application program or an interactive user. In the Open Systems Interconnection (OSI) communications model, the Application layer provides services for application program that ensure that communication is possible. The Application layer is NOT the application itself that is doing the communication. It is a service layer that provides these services: (1) Makes sure that the other party is identified and can be reached; (2) if appropriate, authenticates a sender, receiver, or both; (3) makes sure that necessary communication resources, such as a modem in the sender's computer, exist; (4) ensures agreement at both ends about error recovery procedures, data integrity, and privacy; and (5) determines protocol and data syntax rules at the application level.

OSI is a standard description or "reference model" for how messages should be transmitted between any two points in a telecommunication network. Currently, OSI is Recommendation X.200 of the ITU-TS, which is incorporated herein by reference. OSI divides telecommunication into seven layers. The layers are in two groups. The upper four layers are used whenever a message passes from or to a user. The lower three layers (up to the network layer) are used when any message passes through the host computer. Messages intended for this computer pass to the upper layers. Messages destined for some other host are not passed up to the upper layers but are forwarded to another host. The seven layers are: Layer 7 (the application layer)—the layer at which communication partners are identified, quality of service is identified, user authentication and privacy are considered, and any constraints on data syntax are identified; Layer 6 (the presentation layer, sometimes called the syntax layer)—the layer, usually part of an operating system, that converts incoming and outgoing data from one presentation format to another; Layer 5 (the session layer)—sets up, coordinates, and terminates conversations, exchanges, and dialogs between the applications at each end. It deals with session and connection coordination; Layer 4 (the transport layer)—manages end-to-end control and error-checking. It ensures complete data transfer; Layer 3 (the network layer)—handles routing and forwarding; Layer 2 (the data-link layer)—provides synchronization for the physical level and does bit-stuffing for strings of 1's in excess of 5. It furnishes transmission protocol knowledge and management; and Layer 1 (the physical layer)—conveys the bit stream through the network at the electrical and mechanical level. It provides the hardware means of sending and receiving data on a carrier.

As the Internet grows in size and sophistication, more and more content is becoming accessible to users. This content can be easily accessed by anyone who has a client computer and Internet access. However, some of this content may be unsuitable or inappropriate for all Internet users. For example, violent or adult content may be inappropriate for children. Therefore, in some situations it is desirable to limit and/or control user access to such content. For example, businesses may want to restrict their employees from viewing certain content on the Internet. Likewise, parents may wish to block their children's access to violent or adult content on the Internet.

This restriction and/or control of user access to content on the Internet is otherwise known as content filtering. Content filtering allows a system administrator to block or limit content based on traffic type, file type, Web site, or some other category. For example, Web access might be permitted, but file transfers may not.

There have been numerous attempts to provide content filtering using special browsers. These special browsers and associated filtering programs typically screen content by word content, site rating, or URL. The software provider of the special browsers typically keep a master list of objectionable content that must be periodically updated in the special browser or associated filtering program on the users client computer.

However, many of these existing content filtering systems have a number of drawbacks. First, they need to be installed and configured on each and every client computer where controlled access is desired. Such installation and configuration can be time-consuming, inconvenient, and require a basic understanding of computer hardware and software. Additionally, from time to time, the user may be required to install bug-fixes, patches, or updates to configure or maintain the filtering software. This is because additional content must be continually added to a list of restricted sites. Typically, this list must be periodically downloaded and installed by a user to his/her client computer. Moreover, the software and continually growing list of restricted sites may consume valuable client computer memory and CPU resources (especially for searching lengthy databases of disallowed sites), which, in some cases, may limit or effect overall client computer performance. What is more, many children are typically more computer savvy than their parents and often find ways to circumvent the content filtering software without their parent's knowledge.

Another approach to content filtering has been to place filtering software on a proxy server, so that entire networks connected to the proxy server can be filtered. The proxy server typically contains a list of restricted content that is periodically updated. However, each client computer connected to the proxy server must typically also include software that includes the filtering requirements appropriate for that particular client computer. Again this requires software to be installed and configured for each client computer. This is not only time consuming and inconvenient, but may consume much of a system administrators time. If each client computer is not appropriately configured, users may be blocked from content that they should otherwise have access to. Conversely, children and other restricted users may be able to get access to inappropriate content using a particular client computer or alternative software that has not been configured to restrict such content.

In addition, conventional filtering can be bypassed. One method of bypassing conventional filtering is by a DNS/Hosts file bypass. Using this method, the IP address of an objectionable host is entered into the hosts file under another (un-objectionable) name. Another method of bypassing conventional filtering is by a local proxy bypass. Using this method, a user can run a proxy and type in all URLs as "http://UserLocation?target", where "UserLocation" is the URL of the user's own computer and target is the destination site.

Conventional content filtering has several other limitations. For example, content filtering is provided on a computer by computer basis. Also, if a filter list is broad and attempts to provide heightened restrictions, appropriate content may be invariably filtered out along with inappropriate or blocked content. On the other hand, if the filter list is too narrow, inappropriate content is more likely to be accessible.

Therefore, a need exists for a content filtering system that is easily provisioned for one or more client computers with little or no user intervention, such as installation and configuration of software, or updating a list of filtered content, onto the user's client computer. Moreover, a need exists for a filtering system that cannot easily be circumvented, bypassed, tampered with, or disabled at the client computer level.

SUMMARY OF THE INVENTION

According to the invention there is provided a configurable content filtering system. This content filtering system provides users with the ability to rapidly filter content on a network. For example, a parent can limit the access that a child has to content by blocking access to content unsuitable to children. The parent can also configure the content filtering system to block different content for different children, based on the age of each child. The content filtering settings can also be made client-computer-specific. For example, if an adult is using one client computer and a child is using another client-computer, the content filtering can be turned off for the client computer being used by the adult and turned on for the client-computer being used by the child.

The content filtering system is transparent to the user and no software has to be loaded on the user's client-computer. What is more, no special configuration of the user's web Browser is required. The content filtering process is performed on the network and not on the individual client-computer. Therefore an individual other than the control setting authority (for example, the parent) will not be able to bypass the content filtering controls previously set.

According to an embodiment of the invention there is provided a method for filtering content using static source routes. The method uses a rough first pass at a content filtering router, followed with a more detailed check at a filtering server. This preferably speeds up the filtering service provided. A packet containing a request for content is initially received from a client computer at a bi-directional Internet Protocol (IP) communication device. The packet comprises a user identifier and a first destination IP address of a content server that stores content. The bi-directional IP device determines privileges for the user based upon the user identifier and adds the corresponding filter privileges as a bogus IP address that represents one or more filtering categories. The bi-directional IP device also adds a second destination IP address of a content filtering router to the header, as a source specified route, and routes the packet toward the content filtering router.

The content filtering router receives the packet containing a request for content and determines whether the first destination IP address is on a list of IP addresses to be filtered. The content filtering router then routes the packet toward a filtering server for filtering if the first destination IP address is on the list of IP addresses.

The content filtering server receives the packet and determines that the destination IP address is on a content filtered list that lists IP addresses and associated content filtering categories, by comparing the destination IP address to the list. The content filtering server then establishes whether a content filtering privilege of the content filtering privileges matches an associated content filtering category of an IP address on the content filtered list, and blocks the request for content if the content filtering privilege matches the associated content filtering category.

Further according to the invention is a computer program product for use in conjunction with a computer system comprising a client computer, a bi-directional IP device, a content filtering router, and a content filtering server. The computer program product has a computer readable storage medium and a computer program mechanism embedded therein, the computer program mechanism including a communication procedures module for receiving a packet containing a request for content, where the packet comprises a first destination IP address of a content server that stores the content, a second destination IP address of the content filtering router, and content filtering privileges. The computer program mechanism also includes a routing protocol module that utilizes a routing table to determine whether the request for content is to be filtered based on the first destination IP address and routing the request for content toward a filtering server for filtering if the first destination IP address is to be filtered.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DESCRIPTION OF THE PREFERRED EMBODIMENTS

Figure 1:
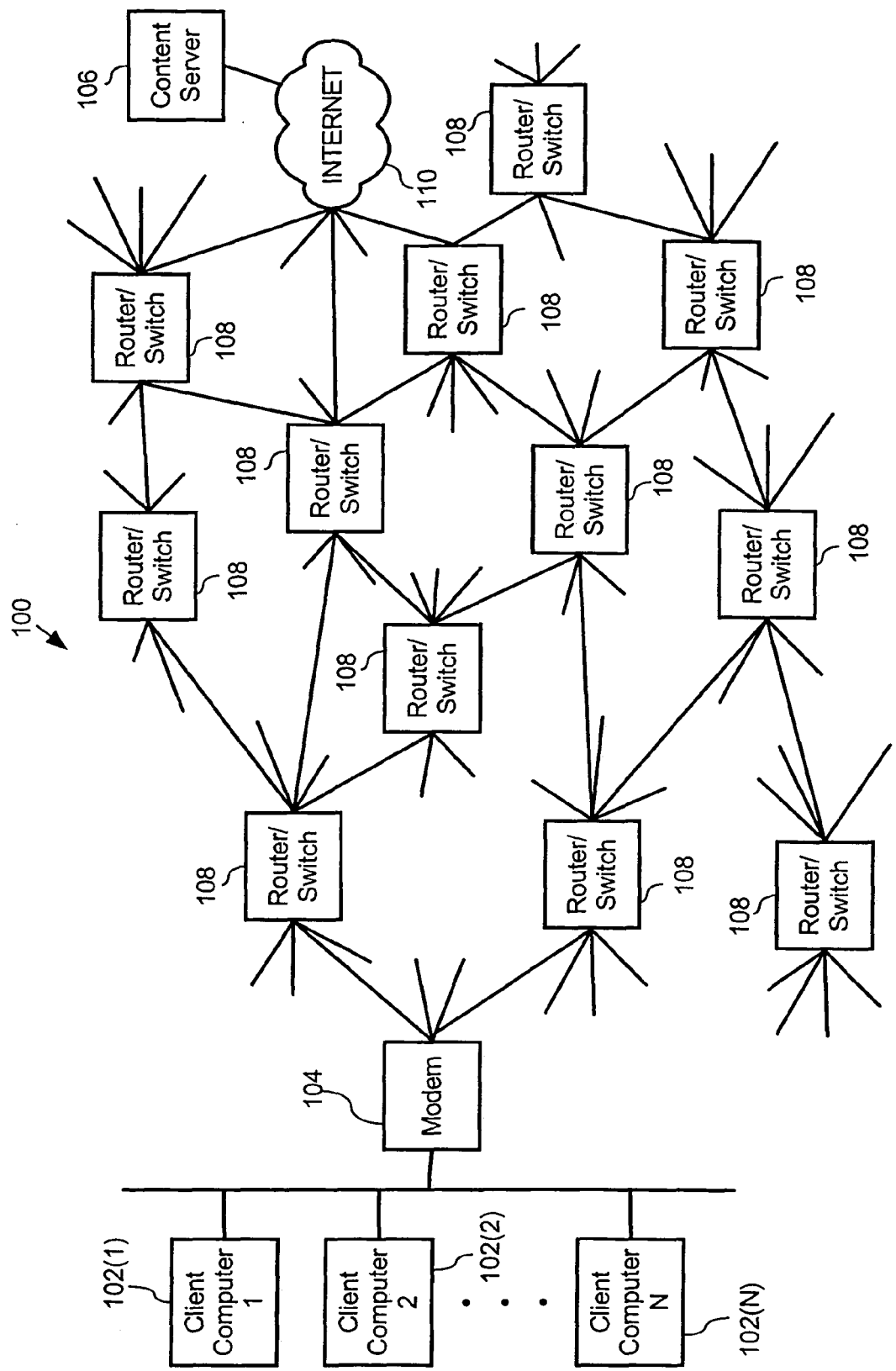
FIG. 1 is a schematic of the typical system architecture for connecting to the Internet.

FIG. 1 is a schematic of a typical system architecture 100 for connecting to the Internet. Typically one or more client computers 102(1)-(N) connect to a modem 104, such as a dial-up modem, which in turn connects to the Internet 110 via one or more routers or switches 108.

A router is a device that forwards data packets from one computing device to another. Based on routing tables and routing protocols, routers read the network address in each transmitted frame or packet and make a decision on where to send it based on the most expedient route (traffic load, line costs, speed, bad lines, etc.). Routers work at layer 3 in the protocol stack, i.e., the network layer, whereas bridges and switches work at the layer 2, i.e., the data link (Media Access Control (MAC)) layer.

Requests for content located on the Internet 110 are transmitted from the client computers 102(1)-(N) to the modem 104 in a frame or packet. The modem 104 then forwards the packet to a first router or switch 108 which in turn forwards the packet to the next router or switch 108, and so on until the packet reaches its intended destination, namely content server 106, coupled to the Internet 110. The content server 106 then serves the requested content back to the client computer 102(1)-(N) that made the request via the most expedient route, i.e., via the same or other routers or switches 108.

Each packet request contains an Internet Protocol (IP) header having at least one source IP address, at least one destination IP address, and data, such as a request for content. The source IP address is typically the IP address of the client computer 102(1)-(N) that made the request, while the destination IP address is typically the IP address of the content server 106.

Figure 2:
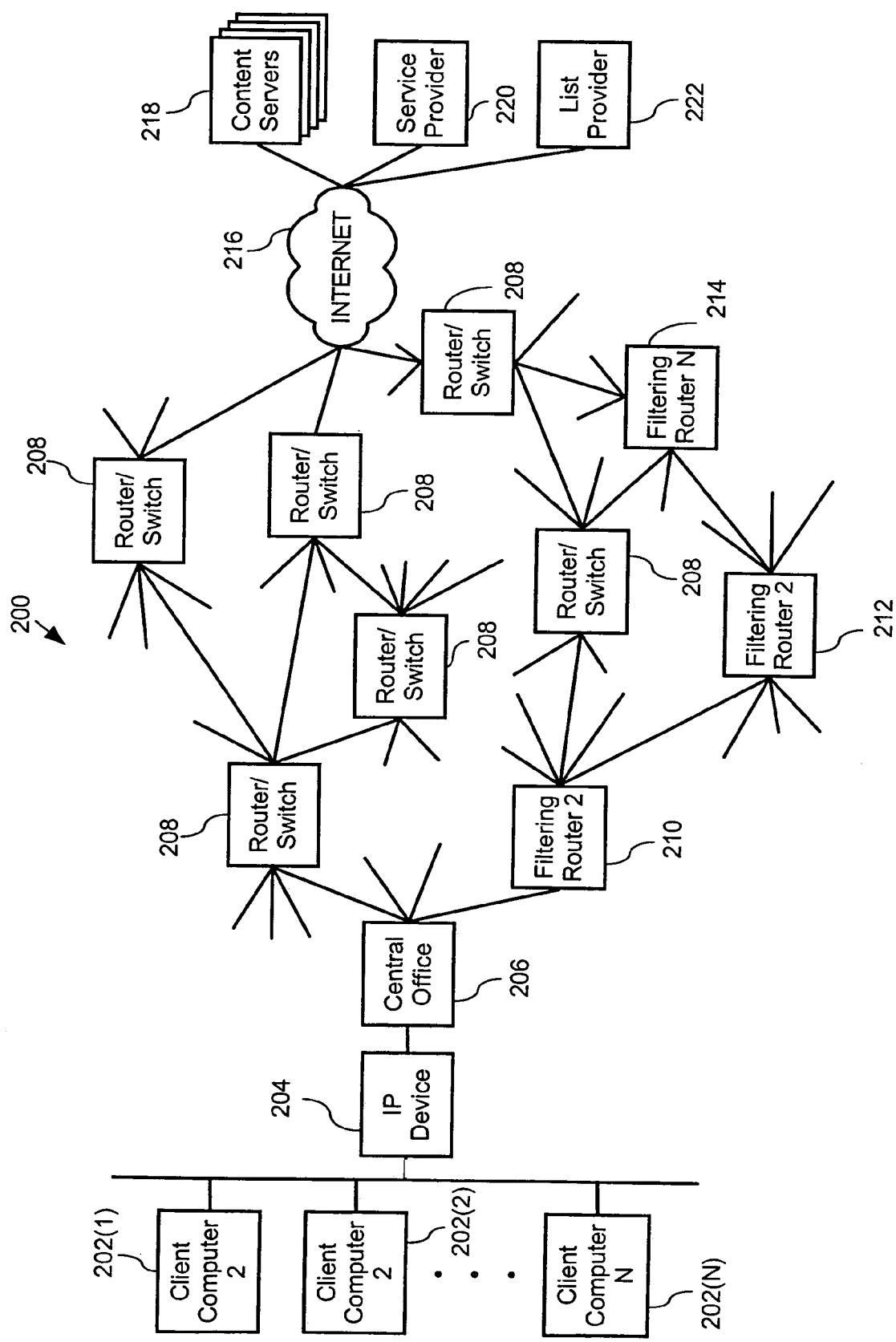
FIG. 2 is a schematic of a system architecture for content filtering according to an embodiment of the invention.

The system architecture of a content filtering system 200 according to an embodiment of the invention is shown in FIG. 2. The content filtering system 200 prevents a user from accessing unauthorized content located on a network, such as the Internet 216. Unauthorized content may include undesirable, inappropriate, or extreme content, such as violence, hate, gambling or adult content.

One or more client computers 202(1)-(N) connect to a bidirectional IP communication device (IP device) 204. The client computers 202(1)-(N) and IP device 204 are coupled to one another by any suitable means, such as Ethernet, cable, phone line, optical fiber, wireless, or the like. The client computers 202(1)-(N) include any network client device, such as desktop computers, laptop computers, handheld computers, cell phones, or any other network client device that acts to initiate IP connections. Each of the client computers 202(1)-(N) preferably includes network access software, such as an Internet Browser, like MICROSOFT'S INTERNET EXPLORER or NETSCAPE'S NAVIGATOR. Unlike the prior art, such network access software does not need to be specially configured for the content filtering system 200. In fact, because the filter interaction runs on network-based equipment, like the IP device 204, no filtering software needs to be present on the client computers 202(1)-(N) whatsoever. This is especially useful when the client is not capable of loading software. In addition, each client computer 202(1)-(N) is uniquely identifiable by a unique source IP address.

The IP device 204 is any communication device that transmits and receives data over IP, preferably a broadband modem or gateway, such as a Digital Subscriber Line (DSL) or cable modem/gateway.

The IP device 204 uses a connectivity topology, such as is typically found in, for example, a central office 206. The central office 206 may be a local telephone company switching center (for DSL), a cable company's central office (for cable), a Internet Service Provider's (ISPs) Point of Presence (POP) (for dial-up), or the like. Other methods include satellite cable, wireless networking, or other connectivity topologies.

The central office 206 is coupled to the Internet 216 via one or more routers or switches 208 and one or more filtering routers 210, 212, and 214. The routers or switches 208 are the same as the routers or switches 108 described in relation to FIG. 1. The filtering routers 210, 212, and 214 are routers that are used for content filtering as described in further detail below. Each filtering router 210, 212, or 214 is used to filter one category of content, where a category is a type or level of content, such as violent content, adult content, religious content, or the like. For example, filtering router 210 is used to filter possible violent content while filtering router 212 is used to filter possible adult content. In an alternative embodiment, one or more of the filtering routers are combined on a Virtual Local Area Network (VLAN).

Content servers 218, a service provider 220, and a list provider 222 are also coupled to the Internet 216. The content servers 218 store and serve content to client computers 202(1)-(N), while the service provider 220 provides the content filtering service described below. The list provider 222 generates, stores, and provides a list of questionable content that may be unsuitable or inappropriate and, therefore, subject to the filtering system. Such a list of content preferably contains numerous URLs or IP addresses of the location of such questionable content. The list also preferably contains each questionable content's associated category, such as religion, entertainment, and adult content. This allows the content filtering system to selectively customize the filtering system for each individual user. A suitable list provider 222 is WEBSENSE of California, U.S.A. WEBSENSE's list of filtered content currently contains 2.6 million Web sites, covering 500 million Web pages.

Figure 3:
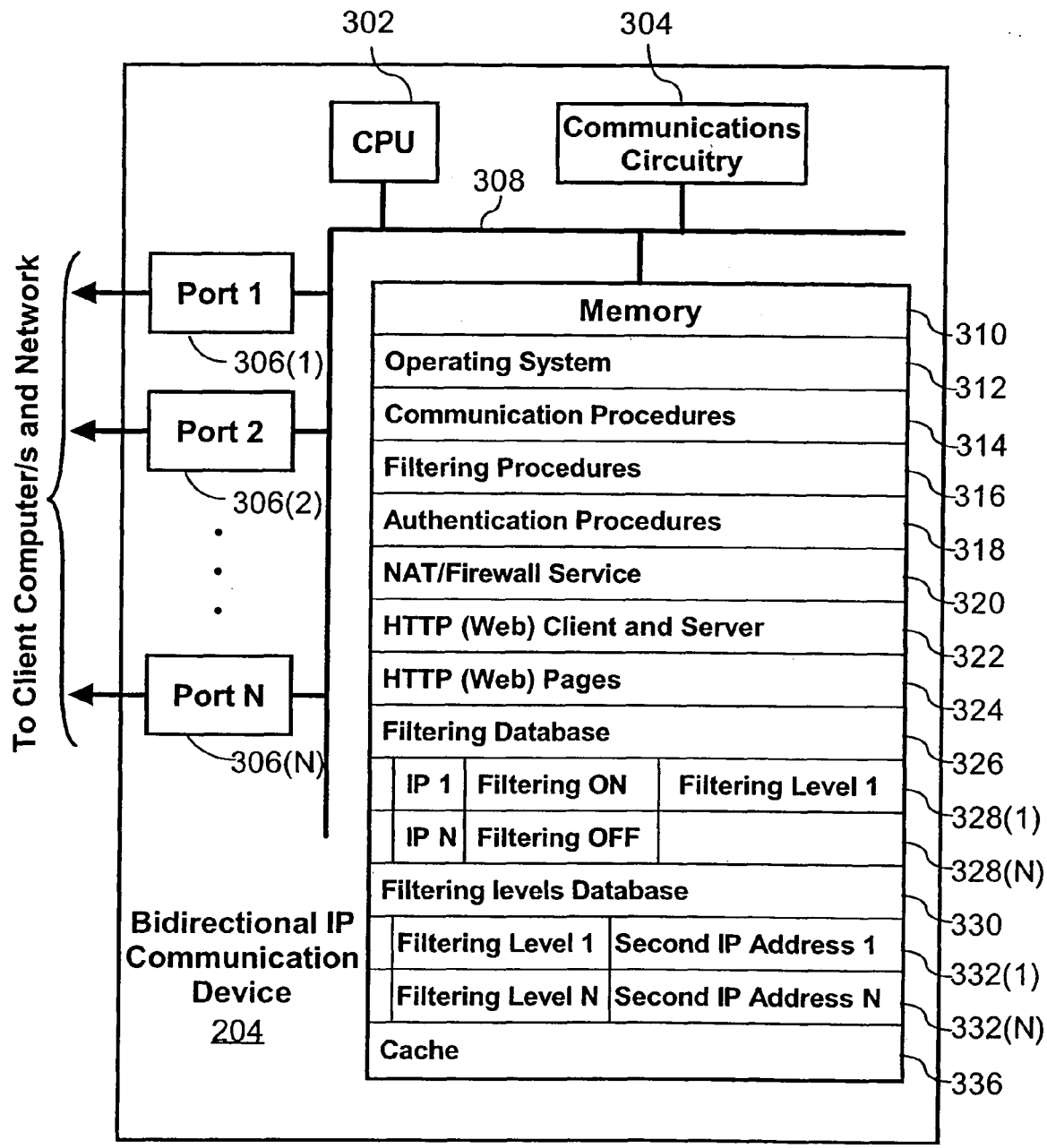
FIG. 3 is a block diagram of the bidirectional IP communication device shown in FIG. 2.

FIG. 3 is a block diagram of the IP device 204 shown in FIG. 2. The IP device 204 preferably comprises at least one data processor or central processing unit (CPU) 302, a memory 310, communications circuitry 304, communication ports 306(1)-(N), and at least one bus 308 that interconnects these components. The communications circuitry 304 and communication ports 306(1)-(N) preferably include one or more Network Interface Cards (NICs) configured to communicate over Ethernet with the client computers 202(1)-(N) (FIG. 2).

Memory 310 preferably includes an operating system 312, such as VXWORKS or EMBEDDED LINUX, having instructions for processing, accessing, storing, or searching data, etc. Memory 312 also preferably includes communication procedures 314; filtering procedures 316; authentication procedures 318; a Network Address Translation (NAT)/Firewall service 320; a HTTP (Web) Client and Server 322; HTTP (Web) Pages 324; a filtering database 326; a filtering levels database 330; and a cache 336 for temporarily storing data.

The communication procedures 314 are used for communicating with both the client computers 202(1)-(N) (FIG. 2), and the Internet 216 (FIG. 2). The filtering procedures 316 are used for filtering content as explained in further detail below. The authentication procedures 318 are used to authenticate a user for content filtering services. The NAT/Firewall service 320 converts a local IP address of each client computer 202(1)-(N) (FIG. 2) into a globally routable IP address for the Internet and vice versa. It also serves as a firewall by keeping individual IP addresses of the client computers hidden from the outside world.

The HTTP (Web) Client and Server 322 requests and serves the HTTP (Web) Pages 324. The filtering database 326 contains a table 328(1)-(N) of: Source IP addresses for each client computer 202(1)-(N) connected to the IP device 204; an indication of whether the filtering service is active for each Source IP address; and an indication of the filtering level for each active Source IP address. The filtering level is preferably a number that indicates the level of filtering that requests from a particular client computer are subject to. For example, all requests from client computer 202(1) may be subject to filtering level 1, which means that requests for content originating from client computer 202(1) will only be subject to filtering for say violent content.

The filtering levels database 330 contains a table 332(1)-(N) listing various filtering levels and the IP address of the filtering router that is configured to filter all requests for that filtering level. For ease of explanation, the IP address of each filtering router 210, 212, or 214 (FIG. 2) will hereafter be referred to as a second destination IP address, as compared to a first destination IP address of a content server to where the request for content is sent. For example, if it is determined that requests from a particular client computer are subject to filtering level 3, then such requests are routed first to a filtering router for level one, then to a filtering router for level two, and finally to a filtering router for level three. This filtering system is explained in further detail below. The IP device 204 also contains a cache 336 for temporarily storing data.

Figure 4:
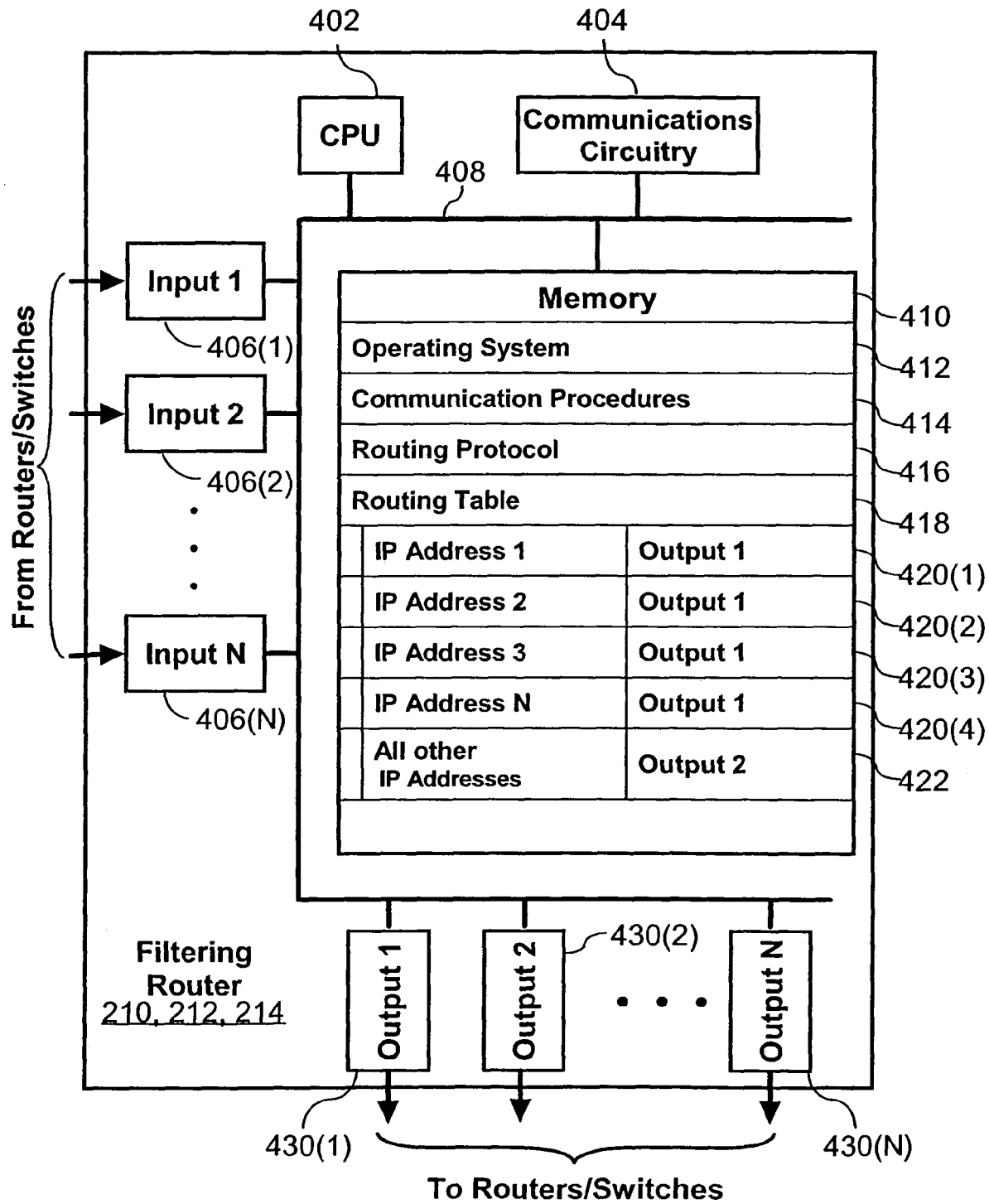
FIG. 4 is a block diagram of the filtering router shown in FIG. 2.

FIG. 4 is a block diagram of the filtering router 210, 212, or 214 shown in FIG. 2. The filtering routers 210, 212, or 214 preferably comprise at least one data processor or central processing unit (CPU) 402, a memory 410, communications circuitry 404, input ports 406(1)-(N), output ports 430(1)-(N), and at least one bus 408 that interconnects these components.

The communications circuitry 404, input ports 406(1)-(N), and output ports 430(1)-(N) are used to communicate with the client computers 202(1)-(N) (FIG. 2), routes/switches 208 (FIG. 2), and the Internet 216 (FIG. 2).

Memory 410 preferably includes an operating system 412, such as VXWORKS or EMBEDDED LINUX, having instructions for processing, accessing, storing, or searching data, etc. Memory 410 also preferably includes communication procedures 414; a routing Protocol 416, such as the Border Gateway Protocol (BGP); and a routing table 418, such as a BGP routing table. BGP is a routing protocol that is used to span autonomous systems on the Internet. BGP is used by the filtering routers 210, 212, and/or 214 to determine the appropriate path to forward data toward. BGP is a robust, sophisticated and scalable protocol that was developed by the Internet Engineering Task Force (IETF). For further information on BGP please see Request for Comments (RFCs) 1105, 1163, 1164, 1265, 1266, 1267, 1268, 1269, 1397, and 1403 all of which are incorporated herein by reference.

The routing table 418 comprises a list of IP addresses and their associated output port numbers 420(1)-(5) and 422. The list of IP addresses partially contains the IP addresses 420(1)-(4) of content that is to be filtered by a particular filtering router 210, 212, and/or 214. For example, filtering router 210 contains a list of all IP addresses 420(1)-(4) for a specific category, such as violent content. Each IP address 420(1)-(4) of content that is to be filtered is routed to a particular output port, such as output port 1 430(1). This effectively routes a request for filtered content to someplace other that the destination IP address (first destination IP address) of the content server 218 (FIG. 2) that stores the requested content. Requests directed to all other IP addresses 422, i.e., the IP addresses of non-filtered content, are routed to another port, such as port 2, and onward toward the destination IP address (first destination. IP address). A more detailed explanation of this process is provided below in relation to FIGS. 7A and 7B.

Figure 5:
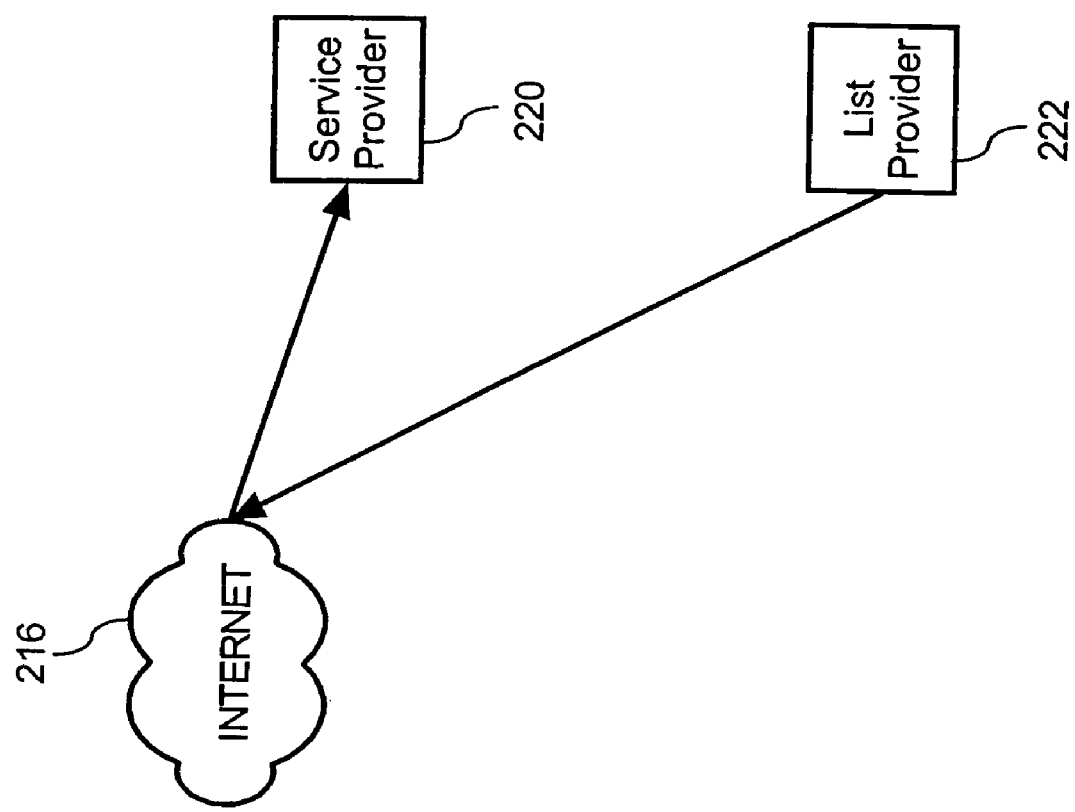
FIG. 5 is a route diagram of a process for updating a filter list on the service provider shown in FIG. 2.

FIG. 5 is a route diagram of a process for updating a filter list on the service provider 220 shown in FIG. 2. Periodically, or whenever the filter list is updated, the list provider 222 provides for the transmission 710 of (FIG. 7A) the filter list to the service provider 220, preferably via the Internet 216. The service provider 220 then saves 708 (FIG. 7A) the list. Once the updated filter list has been received by the service provider from the list provider, the service provider 220 breaks down the list into individual categories, such as violence, pornography, etc., and associates a particular output port 430 (FIG. 4) of a particular filtering router 210, 212, or 214 with each IP address to be filtered. The service provider then sends the list having individual categories and output ports to the content filtering router, which accepts 706 (FIG. 7A) the list and stores 712 (FIG. 7A) the list in its routing table.

Figure 6:
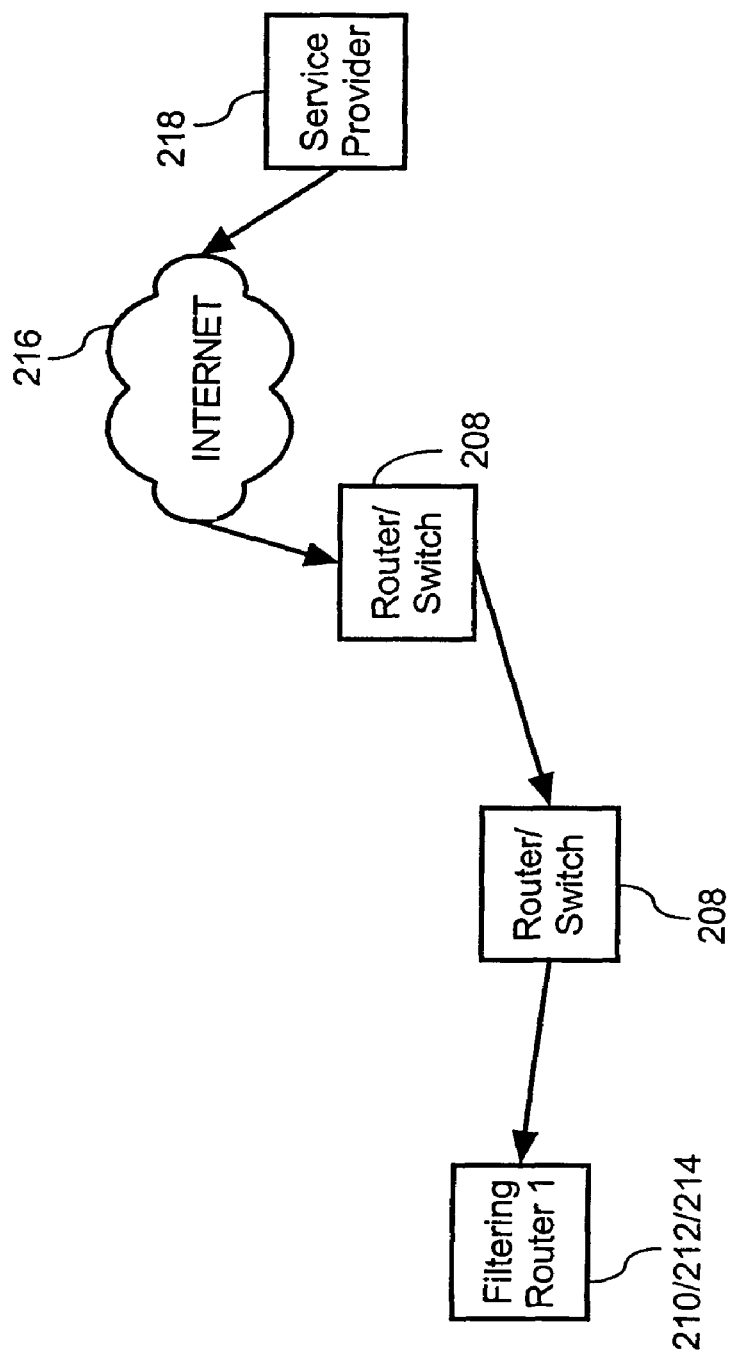
FIG. 6 is a route diagram of a process for updating a filter list on a content filtering router shown in FIG. 2.

FIG. 6 is a route diagram of a process for updating a filter list on a content filtering router shown in FIG. 2. Each individual category has its own filter list, which is transmitted 708 (FIG. 7A) to the particular filtering router 210, 212, or 214 configured to filter the specific category. These individual category lists are preferably transmitted via the Internet 216 and various routers and/or switches 208. The filtering router 210, 212, or 214 then stores 712 (FIG. 7A) the received filter list in its routing table 418 (FIG. 4), preferably overwriting any previous list.

Figure 7A:
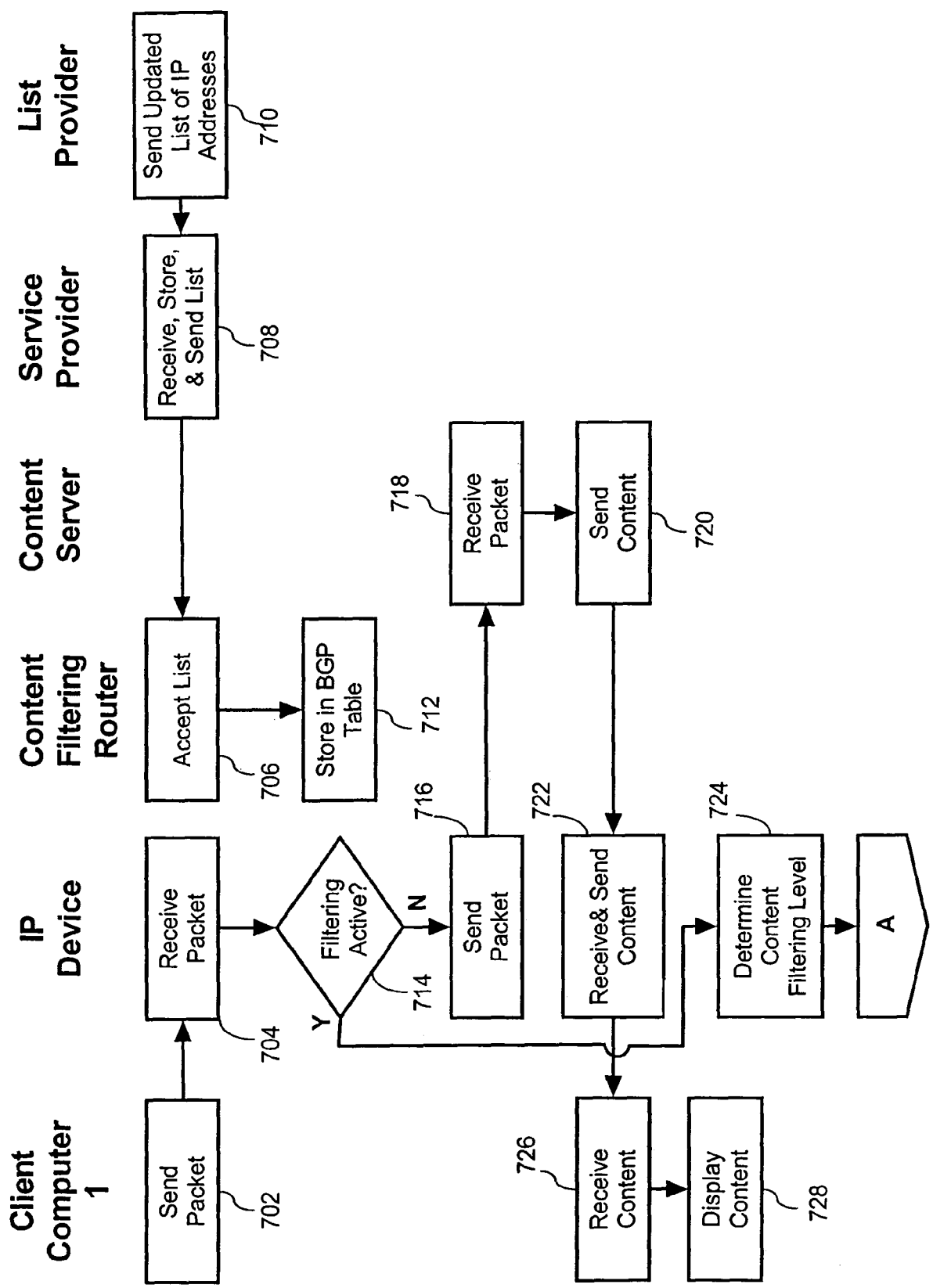
FIGS. 7A-7B are flow charts of a method for content filtering according to an embodiment of the present invention.
Figure 7B:
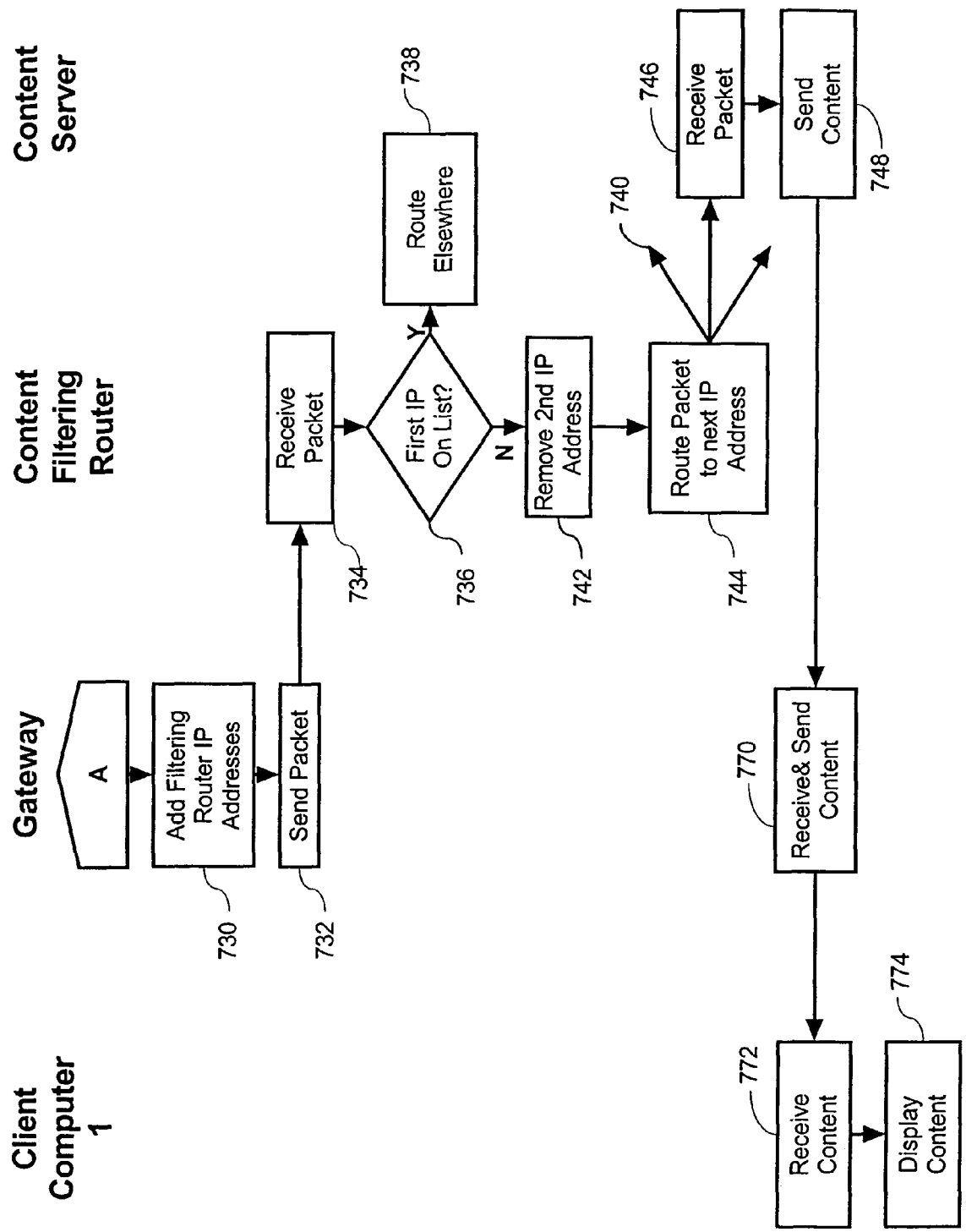

FIGS. 7A-7B are flow charts of a method for content filtering according to an embodiment of the present invention. Using any method for requesting content from a content server 218 (FIG. 2), a user of a client computer 202(1)-(N) (FIG. 2) sends 702 a packet containing a request for content to the IP device 204 (FIG. 2). The packet is received 704 by the IP device, which then determines 714 if the filtering system is active for the particular client computer that made the request. This is determined by looking up the IP address 328(1)-(N) (FIG. 3) of the client computer that made the request, in the filtering database 326 (FIG. 3) on the IP device.

If it is determined that the filtering system is not active for the client computer that made the request (714-No), then the packet is sent 716 to the content server that stores the requested content. The content server receives 718 the packet and locates and sends 720 the content back to the IP device. The IP device receives and sends 722 the content onto the client computer that made the request. The client computer receives 726 and displays 728 the content.

If it is determined that the filtering system is active for the client computer that made the request (714-Yes), then the IP device determines 724 the content filtering level for the particular client computer that made the request. This is done by looking up the corresponding filtering level 328(1)-(N) (FIG. 3) for the IP address of the client computer that made the request. Alternatively, the IP device might require a user identifier and password from the user to apply a filtering level on a user-by-user basis rather than on client-computer-by-client-computer basis. The user identifier is preferably a string of characters that represent a user on the system.

Depending on the filtering level to be applied, the IP device then adds static source routing details to the packet. Specifically, the IP device adds 730 one or more filtering router IP address/es (second destination IP address/es) to the portion of the IP header of the packet reserved for "Source Route Options." Each filtering router then acts as an intermediate hop in a source route, forwarding the source-routed packet to the next specified hop, such as to another filtering router or towards the content server. This is otherwise known as static source routing, which is performed using pre-configured routing tables which remain in effect indefinitely. Dynamic routing, on the other hand, uses special routing information protocols to automatically update the routing table with routes known by peer routers. Further information of static source routing and its loose and strict variations can be found in Request for comments 1122 and 1716, both of which are hereby incorporated by reference.

Each one or more filtering router IP address/es (second destination IP address/es) is the IP address for a different filtering router 210, 212, or 214. The packet might be sent to one or more filtering routers depending on the filtering level for a particular client computer. Each filtering router filters for a different category of filtered content. For example, if a user has subscribed to a filtering service to filter pornographic and violent content, but not religious content, each request for content will be sent to both a filtering router for pornographic content and a filtering router for violent content.

Once the filtering router IP address/es (second destination IP address/es) have been added to the packet, the IP device sends 732 the packet towards the content filtering router specified in the IP header of the packet, i.e., the second destination IP address. The packet is received 734 by the content filtering router 210, 212, or 214 (FIG. 2), which then determines 736 whether the content server IP address (first destination IP address) is on the list 420 (1)-(4) (FIG. 4) of IP addresses to be filtered in the routing table 418 (FIG. 4).

If the content server's IP address (first destination IP address) is not on the list (736-No), then the filtering router's IP address (second destination IP address) is preferably removed 742 from the IP header of the packet. This is done to avoid the content from having to return to the client computer via the filtering router, thereby allowing the content to find the most efficient route back to the client computer using dynamic routing. The packet is then routed 744 to the next destination IP address in the IP header.

If the next destination IP address in the IP header is the IP address of another filtering router, i.e., where the request for content is to be filtered for restricted content in a different category, such as violent content, then the packet is routed 744 to the next filtering router (as indicated by arrow 740). The process that occurs at each subsequent filtering router is similar to that described above and repeats until it is routed to a content server.

If the next destination IP address is the IP address of the content server (first destination IP address), i.e., the content server's IP address is not on the routing table 418 (FIG. 4) and there are no further IP addresses for other filtering routers in the IP header, then the packet is routed 744 to the content server 218 (FIG. 2). The content server then receives 746 the packet and serves or sends 748 the content toward the IP device using standard dynamic routing. The content is then dynamically routed back to the IP device. The content is received and sent 770 by the IP device to the IP address of the client computer that made the request. The client computer subsequently receives 772 and displays 774 the content.

If, however, the content server IP address (first destination IP address) is on the list (736-Yes), then the packet requesting the filtered content is routed 738 someplace other than to the content server 218 (FIG. 2) that stores and serves the requested content. For example, if the requested content contains pornographic material that is to be filtered by a particular filtering router, then the IP address of the content server storing and serving such content will be on the list of IP addresses 420(1)-(4) (FIG. 4) on the routing table 418 (FIG. 4) of that filtering router.

In one embodiment, the packet is simply routed to an output port 430 (FIG. 4) that is not coupled to anything, and the packet is simply discarded. In this case, the user will simply be informed that the content cannot be found. Alternatively, the packet can be sent to the service provider 220, which in turn can send a message to the client computer that made the request, informing the user that the requested content has been blocked or filtered. In yet another embodiment the packet can be sent to the service provider, which in turn sends an authentication message to the user. The user must then supply a username and password to turn off the filtering system or allow a lesser filtering level, i.e., allow the user to view more content.

Figure 8A:
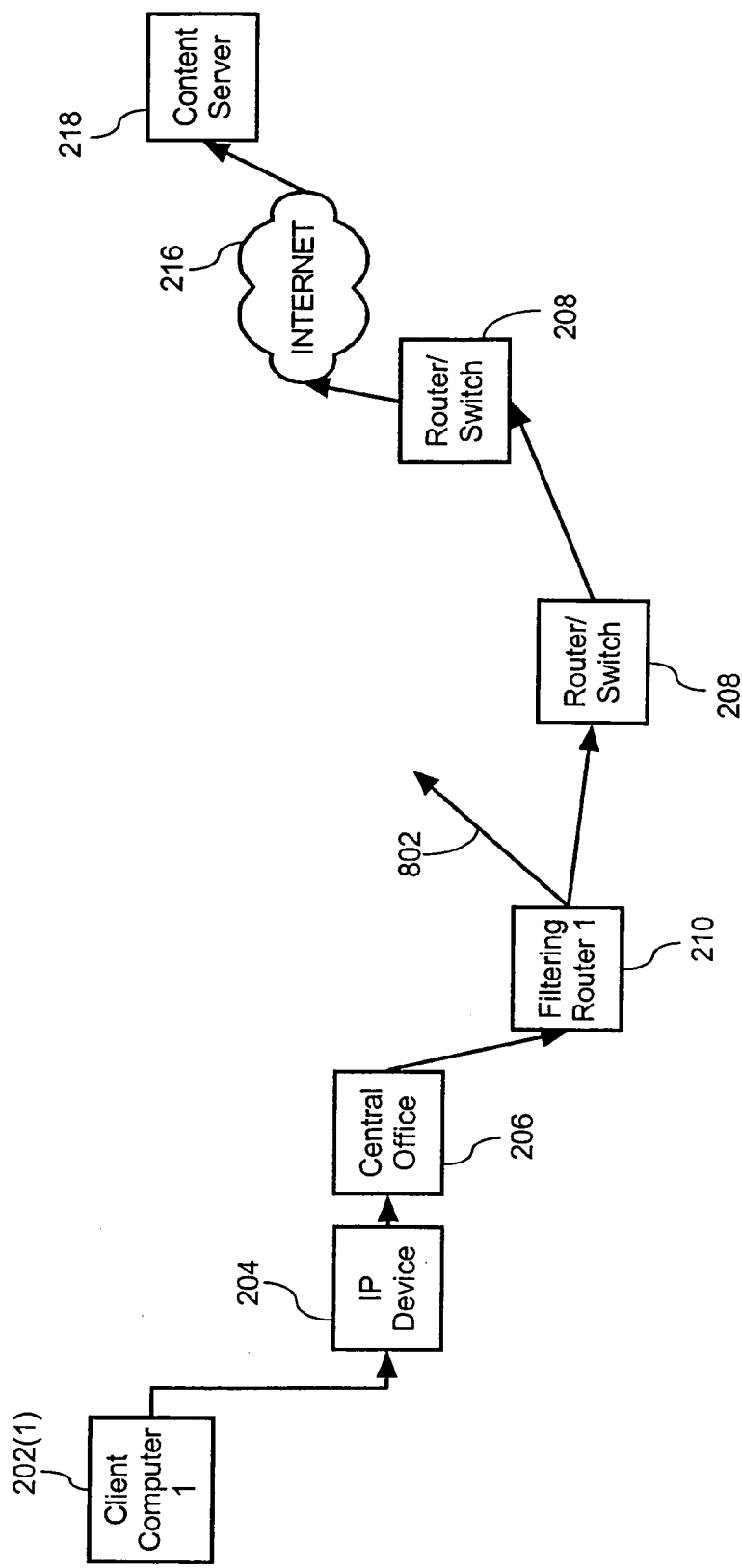
FIG. 8A is a route diagram of a request for content that is filtered by a single filtering router according to the method described in relation to FIGS. 7A and 7B.

FIG. 8A is a route diagram of a request for content that is filtered by a single filtering router 210, according to the method described in relation to FIGS. 7A and 7B. In this scenario, the filtering service is configured to only filter a single category of content, such as violent content. The filtering router that filters this particular category is filtering router 210.

The packet containing the request for content travels from the client computer 202(1) to the IP device 204. The IP device adds a second destination IP address of the filtering router 210 to the IP header of the packet and transmits the packet to the central office 206. The central office 206 forwards the packet towards the filtering router 210 having the second destination IP address. The filtering router then checks whether the first destination IP address of the content server 218 to where the request was directed is on its routing table. If the first destination IP address is on the routing table, the filtering router routes the packet someplace other (802) than the content server. If the first destination IP address is not on the routing table, the filtering router routes the packet towards the content server 218. On its way to the content server 218 the packet may pass through other routers or switches 208.

Figure 8B:
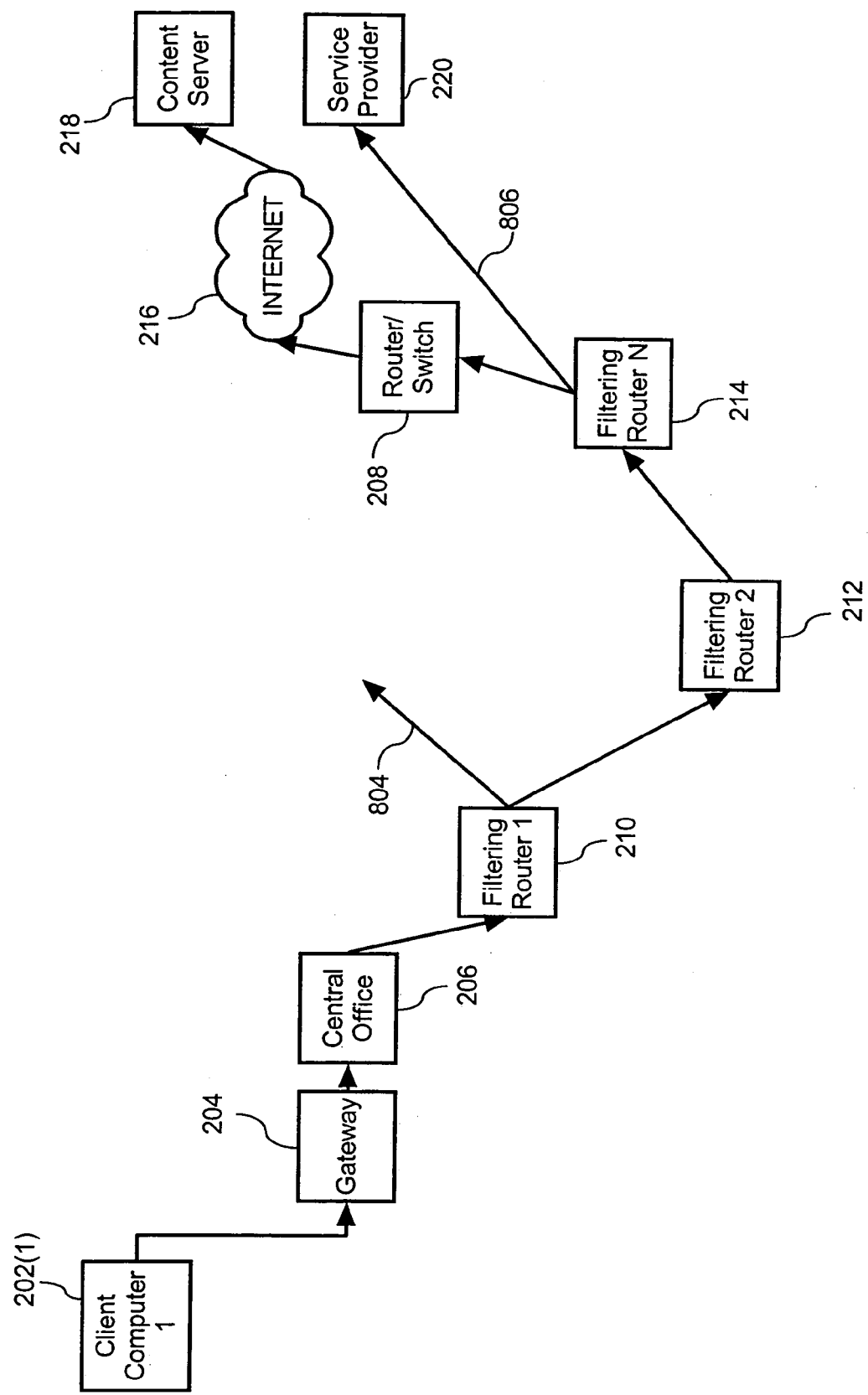
FIG. 8B is a route diagram of a request for content that is filtered by multiple filtering routers according to the method described in relation to FIGS. 7A and 7B.

FIG. 8B is a route diagram of a request for content that is filtered by multiple filtering routers 210, 212, and 214 according to the method described in relation to FIGS. 7A and 7B. In this scenario, the filtering service is configured to filter three categories of content, such as violent, adult, and religious content. Here, the IP device adds three second destination IP addresses of the filtering routers 210, 212, and 214 to the IP header of the packet. Once the first filtering router 210 ascertains that the first destination IP address is not on the routing table, the first filtering router 210 routes the packet towards the second filtering router 212, and so on. If it is ascertained that the first destination IP address is on one of the routing tables of the filtering routers, then that filtering router can either discard (804) the packet or route the packet towards the service provider 220, as explained above in relation to FIGS. 7A and 7B.

Figure 9:
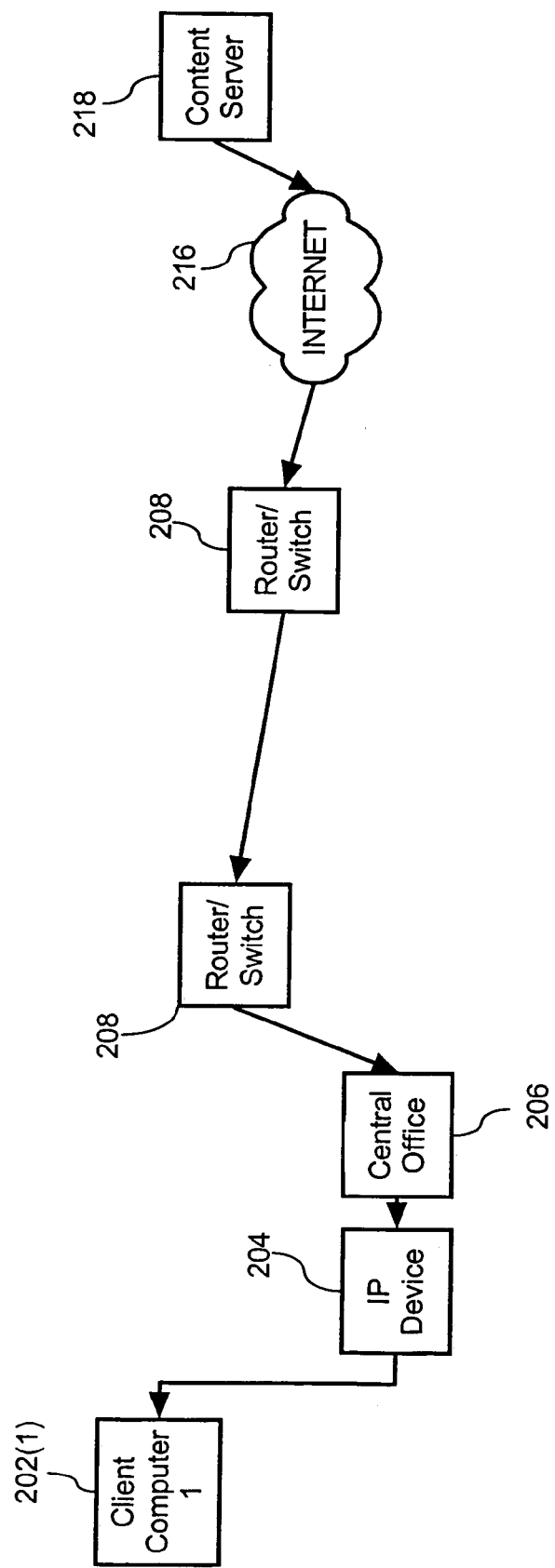
FIG. 9 is a route diagram of the return path of the content to a client computer according to the method described in FIGS. 7A and 7B.

FIG. 9 is a route diagram of the return path of the content to the client computer 202(1) according to the method described in FIGS. 7A and 7B. If the first destination IP address of the content server 218 is not on a routing table of a filtering router through which the packet was routed, then the packet is sent to the content server 218. Once the content server receives the packet containing the request for content, it locates the content and transmits it back toward the source IP address of the client computer that made the request. The content is routed dynamically back to the client computer along the most efficient path available.

In this way, routers can be used to filter content stored on a network by using only network/IP routes instead of application port/URLs. What is more, filtering software need not be stored or updated on any of the client computers. Periodically, if necessary, a revised list of IP addresses for the filtering routers can be sent to and stored in the filtering levels database 330 (FIG. 3) on the IP device. An updated list of the IP addresses of each client computer that has subscribed to the service, and its filtering level, can also periodically be sent to and stored in the filtering database of the IP device. This allows for a maintenance free system for the user that can be remotely updated from the service provider 220 (FIG. 2).

An advantage of the content filtering process is that because the content filtering process is managed through the IP device, the filtering requirements and criteria only need to be set up once, and all client computers are automatically subject to the filtering service. In this way, individual client computers do not need to be individually configured. In addition, the filtering process does not require restricting users to only certain devices in order for the filtering process to be effective, as user names and passwords can be used to update the list of IP addresses and associated filtering levels in the IP device. Additionally, the filtering process requires little user interaction besides signing up for the service. Updating the content filter database on the content filtering server is preferably performed automatically.

Figure 10:
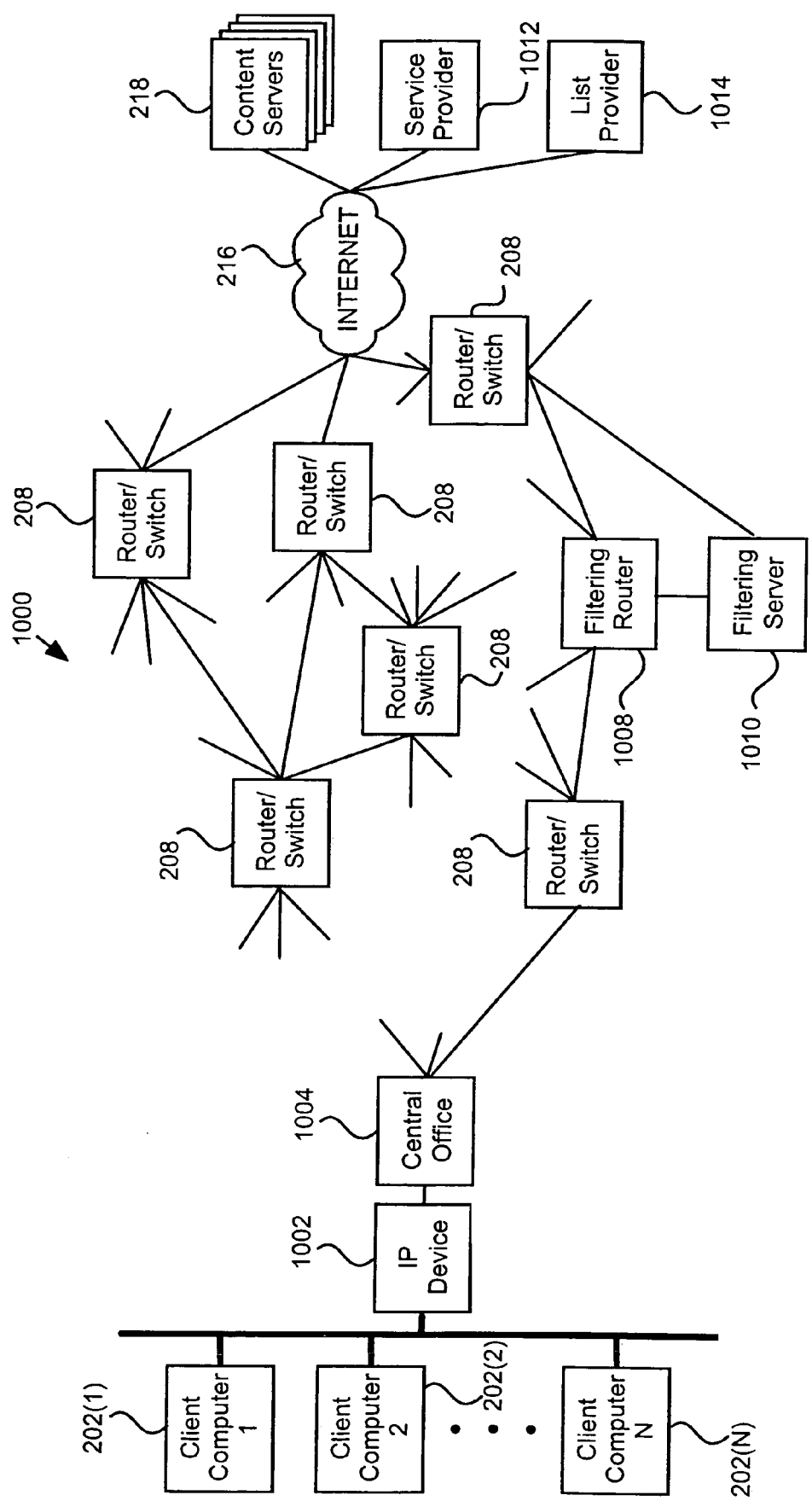
FIG. 10 is a schematic of a system architecture for content filtering according to another embodiment of the invention.
Figure 11:
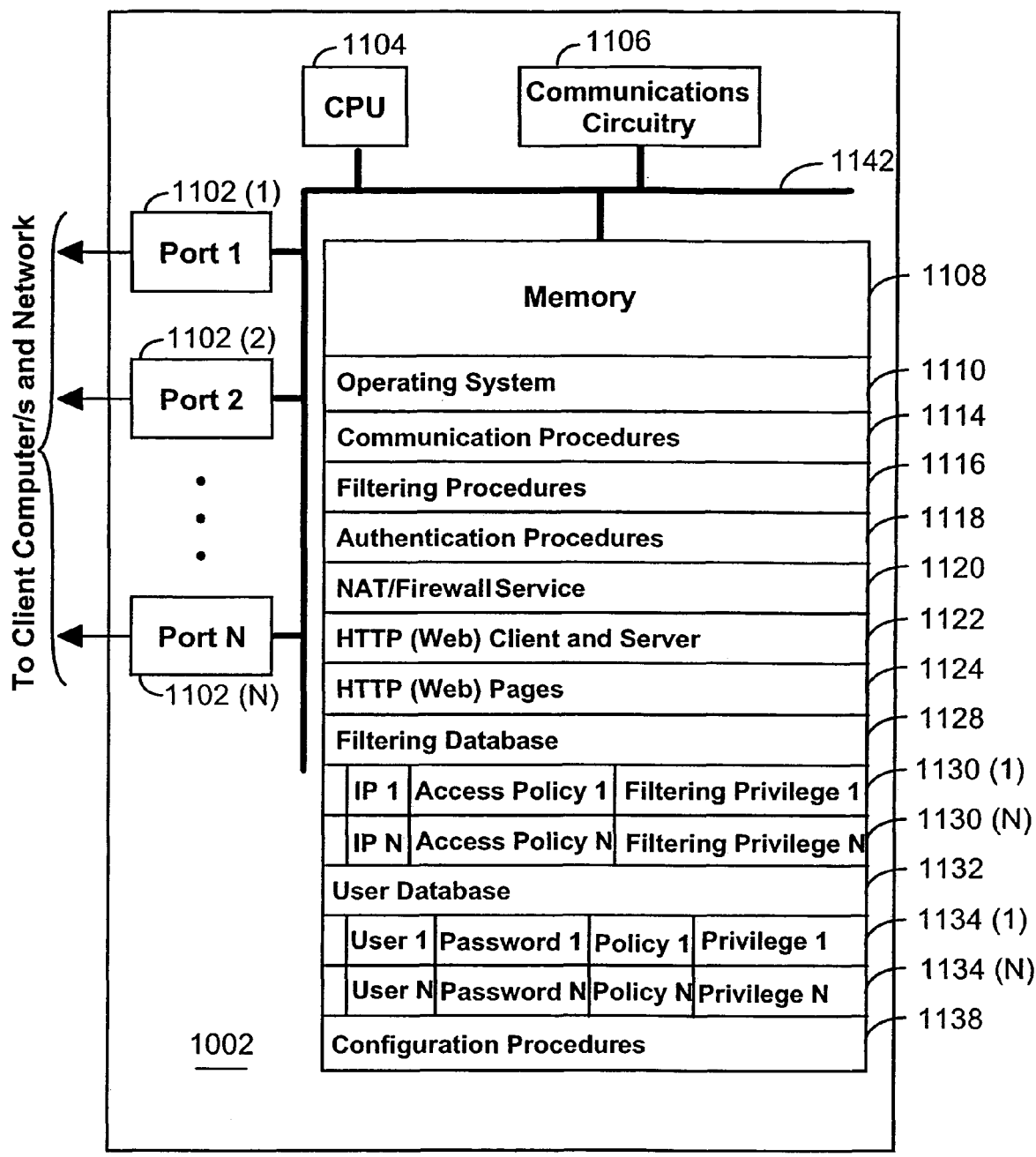
FIG. 11 is a block diagram of the bi-directional IP communication device shown in FIG. 10.
Figure 12:
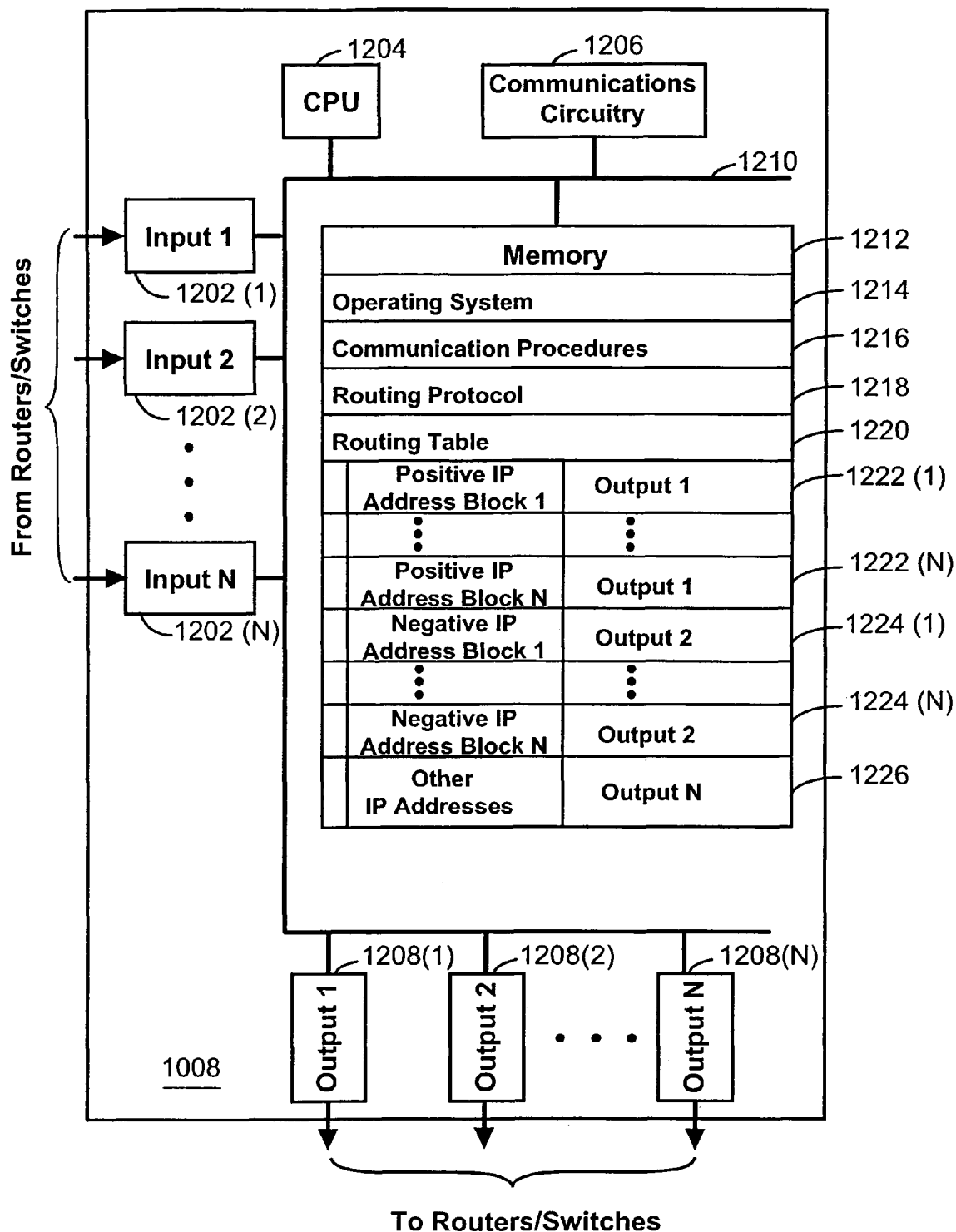
FIG. 12 is a block diagram of the filtering router shown in FIG. 10.
Figure 13:
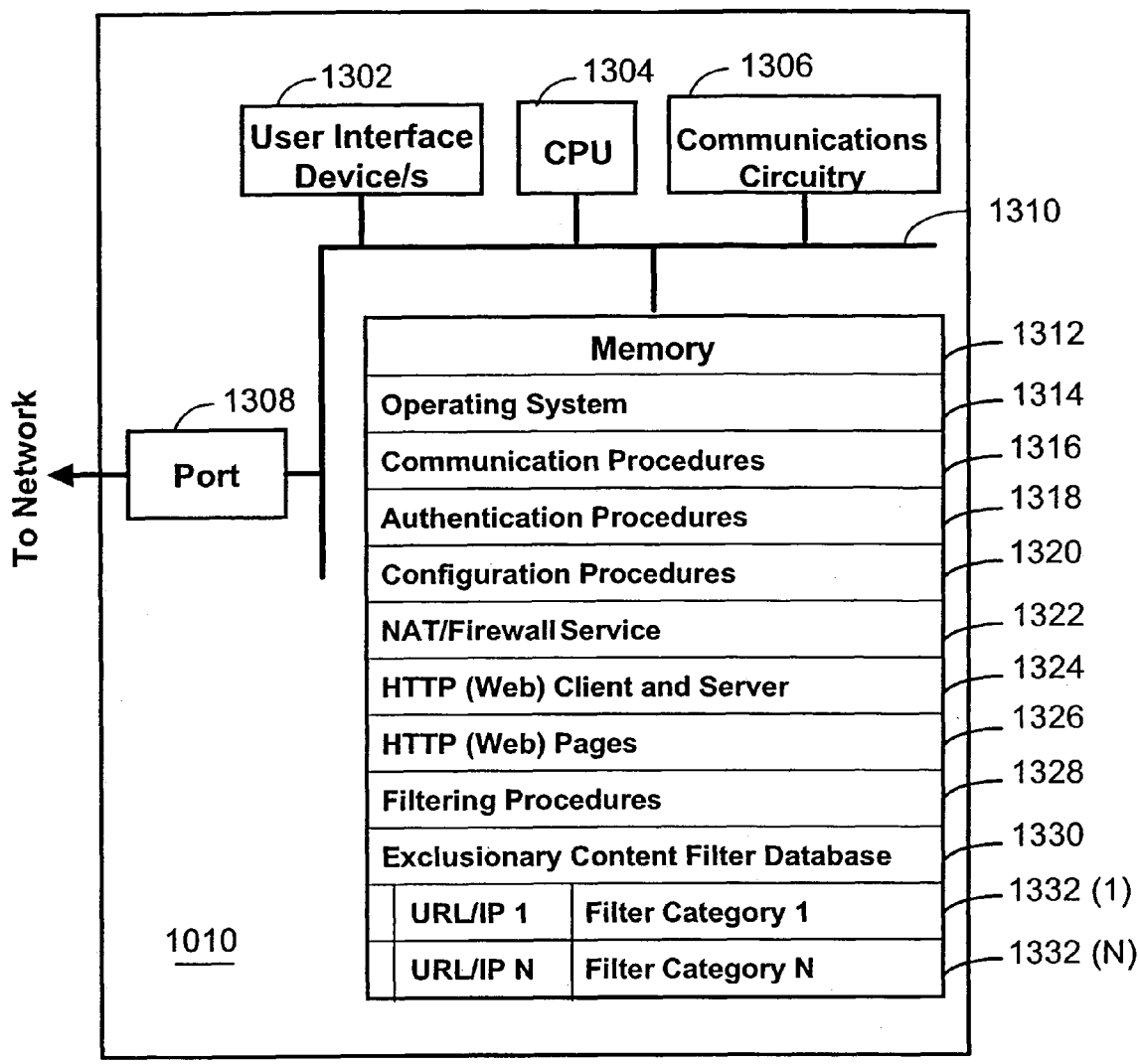
FIG. 13 is a block diagram of the filtering server shown in FIG. 10.

Now, another embodiment of the present invention is described primarily with reference to FIGS. 10-14. In this embodiment, if a customer has signed up for filtering service, a packet is routed from a client computer to a filtering router 1008 (FIGS. 10 and 12). The filtering router 1008 is configured to allow requests for content located on content servers 218 (FIG. 10) having particular first destination IP addresses to bypass a filtering server 1010 (FIGS. 10 and 13). Conversely, requests for content that is definitely to be filtered are sent to the filtering server 1010 for a final determination on whether the content is restricted. This decreases the number of packets that are routed to the filtering server 1010, thereby improving or optimizing system performance.

FIG. 10 is a schematic of a system architecture 1000 for content filtering according to another embodiment of the invention. The system 1000 prevents a user's access to unauthorized content located on a network, such as the Internet. Unauthorized content may include undesirable, inappropriate, or extreme content, such as violence, hate, gambling or adult content. The system 1000 comprises components similar to those in FIG. 2; i.e., client computers 202(1)-(N), routers/switches 208, the Internet or some other network 216, and content servers 218. The system also preferably comprises a bi-directional IP communication device (IP device) 1002, a central office 1004, a filtering router 1008, a filtering server 1010, a service provider 1012, and a list provider 1014. The IP device 1002 is coupled between the client computers 202(1)-(N) and the central office 1004. The filtering router 1008 is coupled between the filtering server 1010 and the central office 1004. The central office 1004, filtering router 1008, and filtering server 1010 are coupled to the Internet 216 via routers/switches 208. Content servers 218, service provider 1012, and list provider 1014 are each coupled to the Internet 216.

Each of the client computers 202(1)-(N), described previously with reference to FIG. 2, is preferably uniquely identifiable by an Internet Protocol (IP) address. An IP address is generally a 32-bit numeric address written as four numbers separated by periods, such as 64.12.15.3, also referred to a quad-octet. This sample address contains two pieces of information: a network identifier and a host identifier, where a host is any device that is attached to the network and uses the Transmission Control Protocol/Internet Protocol (TCP/IP) protocol.

The client computers 202(1)-(N) are assigned IP addresses either from a subnet of globally routable IP addresses, or from a subnet of private globally non-routable IP addresses defined by the RFC 1597 RFC 1918, both of which are incorporated herein by reference. If a subnet of private non-routable IP addresses is used for the client computers then the IP device 1002 provides Network Address Translation (NAT) services to translate the globally non-routable IP addresses to a globally routable IP address that can be routed globally, i.e., to the Internet. The client computers 202(1)-(N) may be any network client device that acts to initiate IP connections.

The IP device 1002 is any device capable of providing communication between the client computers 202(1)-(N) and the Internet 216 and may include a dial-up modem, cable modem, DSL gateway, satellite modem, or the like. The IP device 1002 can act as a router, but preferably has additional capabilities.

A central office 1004 preferably includes a network provider, such as SBC or BELL SOUTH. The network provider connects to the Internet 216 through, for example, a Broadband Service Node (BSN) and at least one router/switch 208. The BSN allows service providers to aggregate tens of thousands of subscribers onto one platform and apply highly customized IP services to these subscribers. A suitable BSN is NORTEL NETWORK's SHASTA 5000. The router/switch 208 is preferably a layer 4 switch, such as a SERVERIRON Web Switch made by FOUNDRY NETWORKS, an ALPINE series switch made by EXTREME NETWORKS, both of California U.S.A., or similar switches and routers made by CISCO or JUNIPER.

The filtering router 1008 and filtering server 1010 provide content filtering and blocking functionality to users of the client computers 202 (1)-(N) as described below in relation to FIG. 13. The filtering server 1010 preferably comprises a CACHEFLOW Internet caching appliance and/or a number of INKTOMI Traffic servers that perform network caching server functions and work with content filtering databases provided by WEBSENSE or SURFCONTROL (both of California U.S.A.).

A content list provider 1014, such as WEBSENSE or SURFCONTROL, generates and provides a list of restricted content and its associated content category, such as hate, violence, religion, and adult categories.

A service provider 1012 provides the systems, methods, and protocols for provisioning and administering the content filtering service for a user. This is done by communicating data, such as configuration details, to and from the IP device 1002, filtering router 1008, and/or filtering server 1010.

FIG. 11 is a block diagram of the IP device 1002 shown in FIG. 10. The IP device 1002 preferably includes ports 1102(1)-(N), a CPU 1104, communications circuitry 1106, a memory 1108, and a bus 1142 connecting the aforementioned components. The ports 1102(1)-(N), CPU 1104, communications circuitry 1106, memory 1108, and bus 1142 are similar to ports 306(1)-(N) (FIG. 3), CPU 302 (FIG. 3), communications circuitry 304 (FIG. 3), memory 310 (FIG. 3), and bus 308 (FIG. 3), respectively.

The memory 1108 preferably includes an operating system 1110, communications procedures 1114, filtering procedures 1116, authentication procedures 1118, a network access translation (NAT)/firewall service 1120, HTTP (Web) client and server 1122, HTTP (Web) pages 1124, a filtering database 1128, a user database 1132, and configuration procedures 1138.

The operating system 1110 preferably has instructions for communicating, processing, accessing, storing, or searching data, etc. The operating system 1110 is, for example, VXWORKS or EMBEDDED LINUX. The communication procedures 1114 are used for communicating with both the client computers 202(1)-(N) (FIG. 10), and the Internet 216 (FIG. 10). The filtering procedures 1116 are used for filtering content from the Internet 216 (FIG. 10) as described below in relation to FIG. 14. The authentication procedures 1118 are used to authenticate a user for content filtering services. The NAT/Firewall service 1120 converts a local IP address of each client computer 202(1)-(N) (FIG. 10) into a globally routable IP address for the Internet and vice versa, if necessary. It also serves as a firewall by keeping individual IP addresses of the client computers hidden from the outside world. The HTTP (Web) Client and Server 1122 requests and serves the HTTP (Web) Pages 1124.

The filtering database 1128 includes a plurality of entries 1130(1)-(N). Each entry may have multiple fields associated with it, such as an IP address of each client computer (e.g., IP 1), an access policy (e.g., access policy 1), and a filtering privilege (e.g., filtering privilege 1). The filtering database 1128 preferably contains an entry for an IP address associated with each client computer 202(1)-(N) that is subscribed to the filtering service. Each access policy preferably includes user time restriction settings. The user time restriction settings are typically done at the gateway level. For example, a user may have an access policy that allows Internet access only from 3:30 p.m. to 8:30 p.m. The access policy for each user also preferably contains other information such as the type of service (e.g., premium or standard), expiry timeout (e.g., the access policy might expire after 1 hour, requiring the user to resupply his or her username and password, etc. The IP device 1002 can restrict access for users by, for example, comparing the time of allowed access (such as from 3:30 p.m. to 8:30 p.m.) to the time that a request is made. The filter privilege indicates a user's level of access to content on the network. Each filter privilege is associated with a filter category selected from categories such as adult content, hate, violence, gambling, etc.

The user database 1132 includes a plurality of entries 1134(1)-(N). Each entry may have multiple fields associated with it, such as a user identifier (e.g., user 1), a password (e.g., password 1), an access policy (e.g., policy 1), and a filtering privilege (e.g., privilege 1). The user database 1132 preferably contains an entry for each user subscribed to the content filtering service.

The filtering database 1128 is dynamic and entries 1130(1)-(N) are updated after a user has successfully authenticated against the user database 1132 using the authentication procedures 1118. For example, when a user logs in from a client computer having a particular IP address, he or she is asked for a username and password. The username and password are associated with an access policy and filtering privilege 1130. Once authenticated, the access policy and filtering privilege 1130 associated with the particular IP address of the authenticated user are updated in the filtering database 1128.

The configuration procedures 1138 are used for supporting the protocol to and from the service provider 1012 (FIG. 10) for remote configuration and administration of the content filtering service.

FIG. 12 is a block diagram of the filtering router 1008 shown in FIG. 10. The filtering router 1008 preferably comprises at least one data processor or central processing unit (CPU) 1204, a memory 1212, communications circuitry 1206, input ports 1202(1)-(N), output ports 1208(1)-(N), and at least one bus 1210 that interconnects the aforementioned components.

The communications circuitry 1206, input ports 1202(1)-(N), and output ports 1208(1)-(N) are used to communicate with the client computers 202(1)-(N) (FIG. 10), routes/switches 208 (FIG. 10), and the Internet 216 (FIG. 10).

Memory 1212 preferably includes an operating system 1214, communications procedures 1216, and a routing protocol 1218, similar to operating system 412 (FIG. 4), communication procedures 414 (FIG. 4), and routing protocol 416 (FIG. 4), respectively. Memory 1212 also preferably includes a routing table 1220, such as a BGP routing table.

The routing table 1220 is used by the filtering router 1008 to determine the appropriate path for routing data. Traffic is preferably routed by the router into two pools, allowed (positive) and possibly not allowed (negative). The routing table 1220 comprises a list 1222(1)-(N), 1224(1)-(N), and 1226 of IP addresses and their associated output port numbers. Note that an IP address is preferably stored in the routing table as an amalgamation of IP addresses, or an IP address block, as explained below. Amalgamated address blocks are used to optimize filtering by reducing the number of entries 1222-1226 in routing table 1220. For example, if a number of IP addresses to be filtered have similar IP addresses, the entire block or subnet including these IP addresses is amalgamated into an IP address block. The IP address block preferably comprises one or more IP addresses, networks, or subnetworks, but may contain no addresses if empty. An address block may be a positive address block, a negative address block, or an other address block, as explained below.

Positive address blocks comprise IP addresses of content servers 218 (FIG. 10) storing content that has been pre-approved (i.e., it has been determined that the content on the content server 218, should not be filtered). For example, when the first destination IP address of a content server 218 matches the IP address in a positive address block and the positive filter category is the only filter specified, no further filtering is required and the packet may be routed towards the content server 218, as per usual. Where the positive address block is a subnet, every IP address that falls within the subnet has preferably been pre-approved. Accordingly, since some packets are pre-approved, the number of packets received by the filtering server is reduced.

Negative address blocks, on the other hand, comprise one or more IP addresses of content servers containing content that probably falls within a filter category. Accordingly, when the first destination IP address of a packet requesting content from a content server 218 has an IP address in a negative address block, further filtering is typically required. It should be noted that when an IP address of a content server 218 is in a negative address block, the content at the content server 218 may actually be suitable for viewing. In other words, where the negative address block comprises a subnet, some IP addresses on the subnet may contain suitable content. However, the filtering router does not attempt to determine whether content at the associated content servers 218 is appropriate and, instead, routes a request for filtered content to someplace other that the first destination IP address of the content server 218 that stores the content, thereby providing for further determination of whether the IP address of the content server should be filtered.

It may seem counterintuitive to amalgamate IP addresses into subnets, when it is known that some of the IP addresses are of content servers containing content that will not ultimately be filtered. However, amalgamating IP addresses into subnets even when some of the IP addresses in the subnet do not fall within a filter category results in larger blocks of grouped IP addresses. This results in a smaller routing table and greatly improved routing performance. Accordingly, in some cases it is desirable to knowingly include IP addresses that are not to be filtered in a negative IP address block. For example, if a subnet has a high proportion of content that falls within a filter category, a negative IP block may include the entire subnet. A more detailed explanation of this process is provided below in relation to FIGS. 14A through 14C.

In one embodiment, other IP addresses, or addresses that appear on neither the positive nor negative lists, are routed to a filtering server in a manner similar to addresses on the negative list. In an alternative embodiment, other IP addresses are routed to a different server (not shown) that causes the first IP address to be categorized as restricted or non-restricted content. This could be accomplished, for example, by checking a database or notifying an administrator to update the list. If other IP addresses are blocked, the client computer may receive a block message that is different from the message that could be received for blocking at the filtering server, such as an "unknown content" restriction. In yet another embodiment, the other IP addresses are routed in a manner similar to addresses on the positive list.

FIG. 13 is a block diagram of the content filtering server 1010 shown in FIG. 10. The content filtering server 1010 preferably includes at least one data processor or central processing unit (CPU) 1304, a memory 1312, communications circuitry 1306, at least one communication port 1308, user interface devices 1302, and at least one bus 1310 that interconnects the aforementioned components. The communications circuitry 1306 and communication port 1308 allow for communication between the filtering server 1008 (FIG. 10), content filtering server 1010, and the remainder of the network.

Memory 1312 preferably includes an operating system 1314, such as VXWORKS, LINUX, SUN SOLARIS, or MICROSOFT WINDOWS having instructions for communicating, processing, accessing, storing, or searching data, etc. Memory 1312 also preferably includes communication procedures 1316; authentication procedures 1318; configuration procedures 1320; a NAT/firewall service 1322; a HTTP (Web) client and server 1324; HTTP (Web) pages 1326; filtering procedures 1328; and an exclusionary content filter database 1330.

The communication procedures 1316, including filter routing specifiers, are used for communicating with the Internet 216 (FIG. 10) and the IP device 1002 (FIG. 10). The authentication procedures 1318 authenticate administrators of the server. The NAT/Firewall service 1322 is similar to the NAT/Firewall service 1120. The HTTP (Web) client and server 1324 request and serve the HTTP (Web) pages 1326. The filtering procedures 1328 are used to control access to content on the Internet 216 (FIG. 10).

The exclusionary content filter database 1330 comprises a list 1332(1)-(N) of URLs or IP addresses and associated filtering categories for each URL/IP entry. For example, the URL <http://www.adultcontent.com> may be associated with filtering category 1, which is, e.g., adult content. In one embodiment, the associated filtering categories are each 32-bit bit fields. A subset of the bits of the bit field represents a filtering category. Accordingly, in this embodiment, the maximum number of filtering categories is 32 (one category per bit of the bit field).

The filtering procedures 1328 compare the URL of the user requested content against a URL (or IP address) of a content entry 1332 in the exclusionary content filter database 1330. The filtering procedures 1328 may also compare the associated filtering categories with the filtering privileges of the user requesting content. In an embodiment, the filtering server provides advanced filter options, such as by-user restrictions and numbers of failures (the user is blocked after a given number of failures).

Figure 14A:
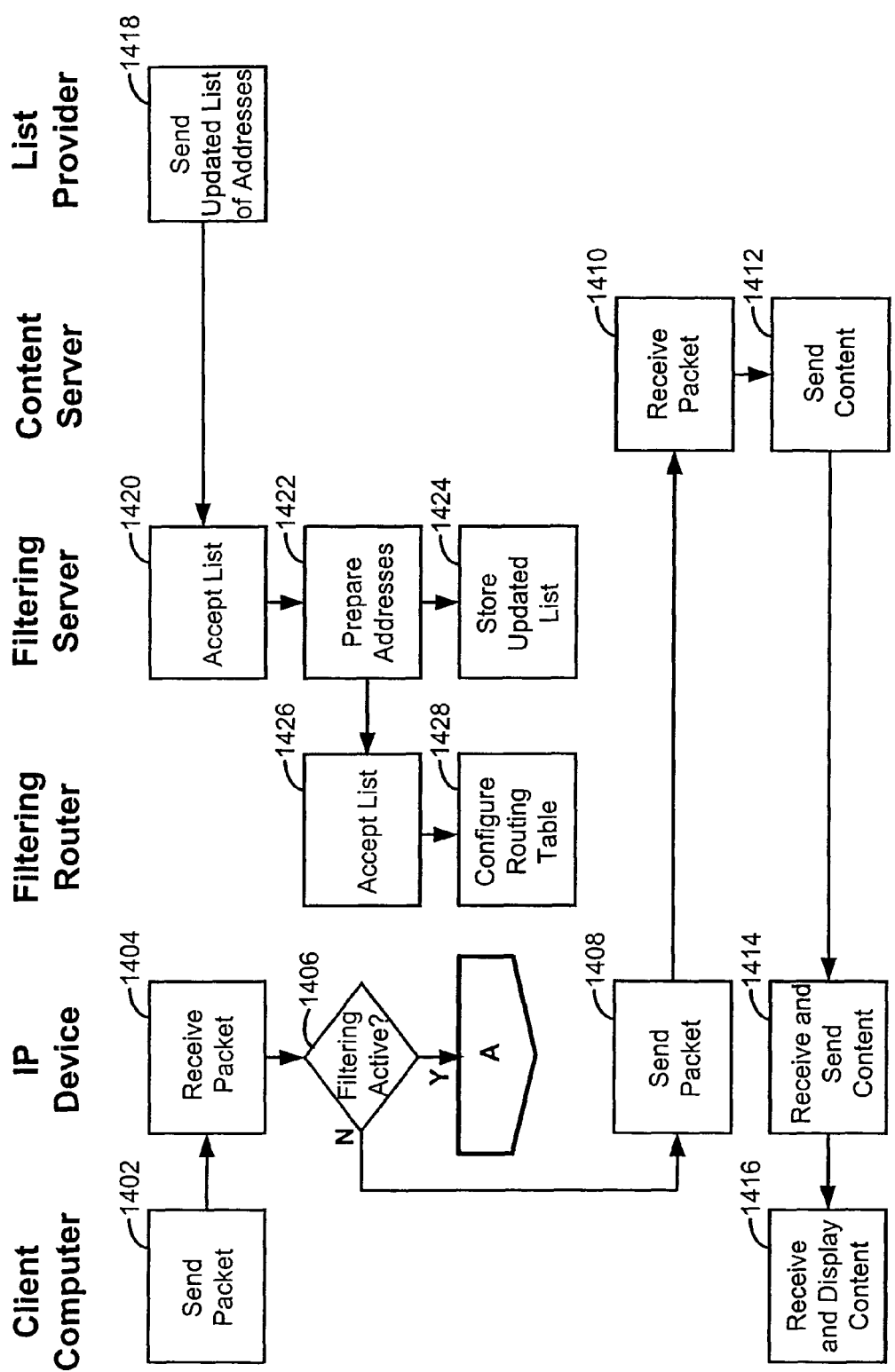
FIGS. 14A, 14B, and 14C are flow charts of a method for content filtering according to an embodiment of the present invention.
Figure 14B:
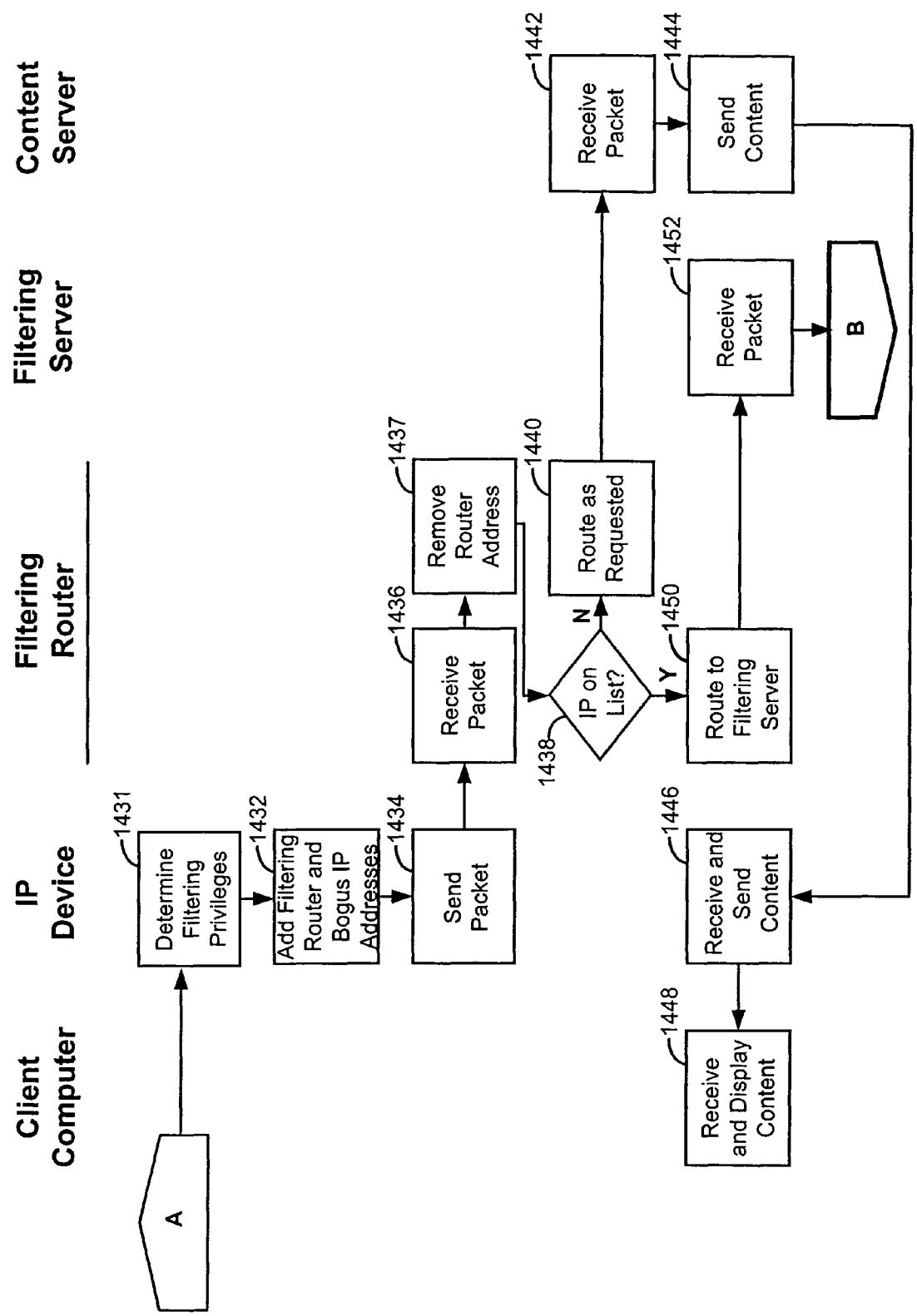
Figure 14C:
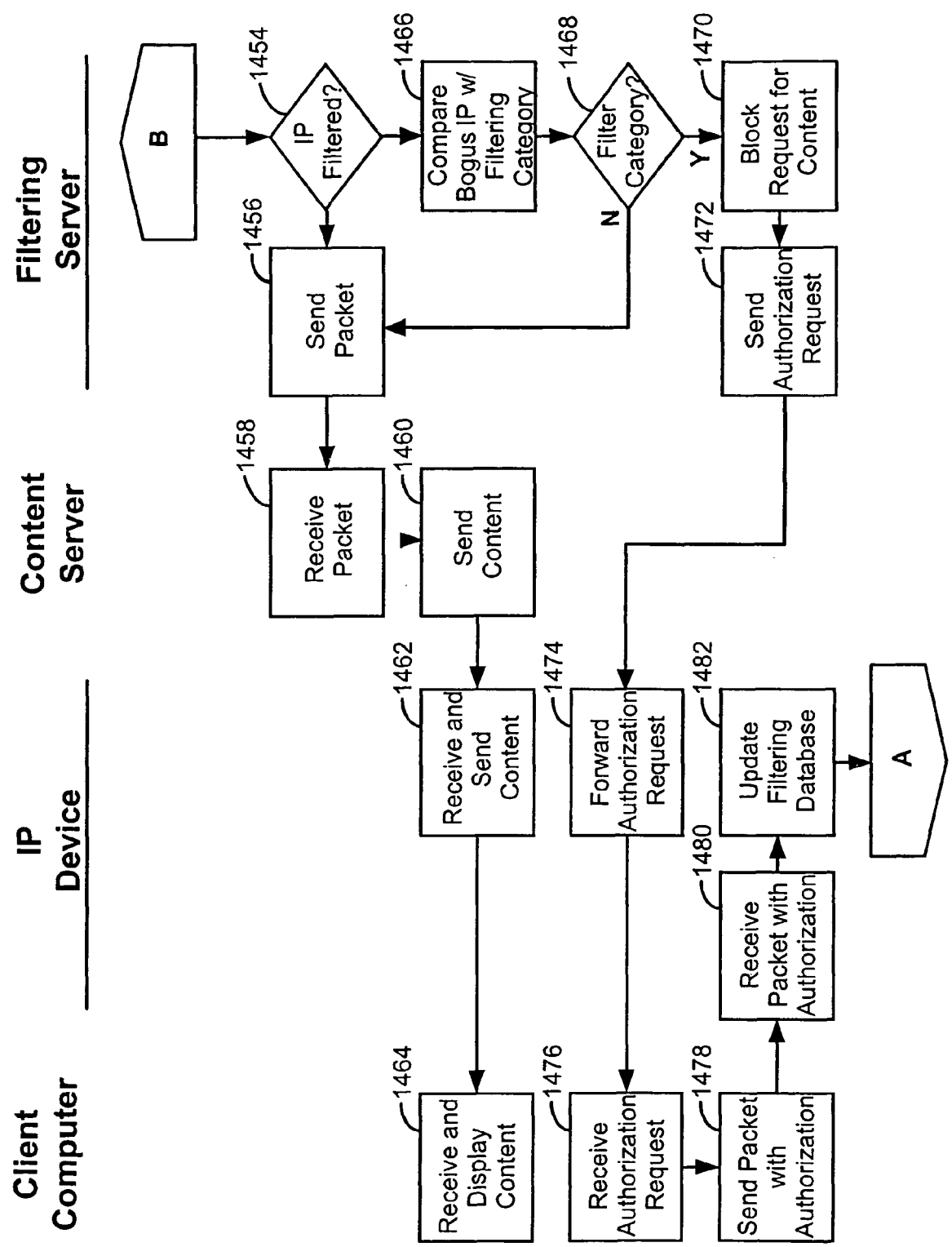

FIGS. 14A-14C are flow charts of a method for content filtering according to an embodiment of the present invention. In FIGS. 14A-14C, the client computer is one of the client computers 202(1)-(N) (FIG. 10); the IP device is the IP device 1002 (FIG. 10); the filtering router is the filtering router 1008 (FIG. 10); the filtering server is the filtering server 1010 (FIG. 10); the content server is one of the content servers 218 (FIG. 10); the service provider is the service provider 1012 (FIG. 10); and the list provider is the list provider 1014 (FIG. 10).

Initially, the list provider sends 1418 an updated list of IP addresses to be filtered and their associated filter categories to the filtering server, which accepts 1420 the list to the filtering server. The list provider typically sends a text-based list of addresses. The filtering server prepares 1422 the addresses for the filtering router by converting the list to the form of route locations or routing specifications. Preferably, the preparation includes amalgamating addresses into IP address blocks. The filtering server preferably stores 1424 the updated list. The filtering router accepts 1426 the prepared addresses and configures 1428 its routing table accordingly. Note that the filtering router could be configured at any time by an administrator or updated with the list sent from the filtering server. In an alternative embodiment, the filtering server provides a list to the filtering router that has already been amalgamated at the filtering server into IP address blocks that are stored in the routing table 1220 (FIG. 12). In an alternative embodiment, a administrator may directly configure the filtering router routing table 1220 (FIG. 12) to include amalgamated IP address blocks.

When a user wishes to use the system, the user preferably logs on to the system by entering a username and password (not shown) via a HTTP browser web page. This optional logon procedure allows the IP device to update the access policy and filtering privilege 1130 (FIG. 11), for the IP address associated with the user. Thus, the IP device preferably applies filtering categories on a user-by-user basis rather than on client-computer-by-client-computer basis. In any case, using any method for requesting content from the content server, a user of the client computer sends 1402 a packet containing a request for content to the IP device. The packet is received 1404 by the IP device, which then determines 1406, using the filtering procedures 1116 (FIG. 11), if the filtering system is active for the particular client computer that made the request or for the user that previously logged in. The filtering procedures 1116 (FIG. 11) look up in entries 1130(1)-(N) (FIG. 11) the IP address of the client computer that made the request, to make this determination.

If it is determined that the filtering system is not active for the client computer that made the request (1406-No), then the packet is sent 1408 to the content server that stores the requested content. The content server receives 1410 the packet and locates and sends 1412 the content back to the IP device. The IP device receives and sends 1414 the content to the client computer that made the request. The client computer receives and displays 1416 the content.

If it is determined that the filtering system is active for the client computer that made the request (1406-Yes), then the IP device determines 1431 the content filtering privileges associated with the particular client computer that made the request. This is done by looking up in the filtering database 1128 (FIG. 11) the corresponding filtering privilege for the IP address of the client computer that made the request.

If the filtering service is active for the particular client computer, the IP device adds 1432 an IP address of the filtering router (second destination IP address) and a bogus IP address to the IP header of the packet reserved for "Source Route Options." This allows static routing, which is performed using pre-configured routing tables which remain in effect indefinitely. However, the bogus IP address, even though it is stored in the header as an "IP address," is not used for routing. Rather, the bogus IP address is used to identify the filtering privileges associated with the client computer. Adding a bogus IP address to the header improves the speed with which the filter categories may be indicated since IP addresses (even bogus ones) can be processed at the network layer.

Since an IP address is 32 bits long, a bogus IP address can contain up to 32 filtering categories. A subset of the bits that make up the bogus IP address represent various filtering categories. In one embodiment, if a bit of the bogus IP address has a value of '1', then the filtering category associated with that bit location is applicable. If, on the other hand, the bit at that bit location has a value of '0', then that filtering category is not applicable. For example, a bogus IP address could have the value 132.0.0.0. Each of the four numbers (132, 0, 0, and 0) may be represented by 8 bits. The number 132 is represented by the binary number 01000100, while each of the 0's are represented by the binary number 00000000. Since the bogus IP address in this example has only two bit locations (the second and the sixth) with a value of 1, the user has filtering privileges for all filtering categories except for filtering categories 2 and 6. If, for example, filtering category 2 is violence and category 6 is hate, the user will preferably be blocked from content that is designated violence or hate.

By indicating the filtering category in this way, filtering procedures 1116 (FIG. 11) on the filtering server can determine the filtering categories that are applicable for the client computer that requested content. For this embodiment, there are $2^{32}$ possible filter category combinations. In an alternative embodiment, multiple bits of a bogus IP address could be used to provide greater detail, such as, for example, a filtering level for a single filtering category. Alternatively, multiple bogus IP addresses could be used to provide greater detail or to provide more filtering categories.

Once the IP address of the filtering router (second destination IP address) and bogus IP address have been added to the packet, the IP device then sends 1434 the packet towards the content filtering router specified in the IP header of the packet, i.e., toward the second destination IP address. The packet is received 1436 by the content filtering router, which removes 1437 the second destination IP address from the header. This is done to avoid the requested content from having to return to the client computer via the filtering router. This allows the content to find the most efficient route back to the client computer using dynamic routing. Then, the filtering procedures 1116 (FIG. 11) determine 1438 whether the content server IP address (first destination IP address) is in an address block in the routing table 1220 (FIG. 12) of the filtering router.

If the content server's IP address (first destination IP address) is in a positive address block (1438), the packet is routed 1440 to the content server as requested. The content server receives 1442 the packet and sends 1444 the content toward the IP device. The content is dynamically routed back to the IP device and received and sent 1446 by the IP device to the client computer that made the request. The client computer subsequently receives and displays 1448 the content. In an alternative embodiment, if the first destination IP address is not in a negative address block (1438), the packet is routed in the same manner as if the first destination IP address is in a positive address block (1438), as just described.

If, however, the content server IP address (first destination IP address) is not in any positive address blocks (1438)—or, in an alternative embodiment, if the first destination IP address is in a negative address block (1438)—then the packet requesting the filtered content is routed 1450 to the content filtering server. The filtering server receives 1452 the packet and determines 1454 whether the IP address is associated with content that should be filtered using the filtering procedures 1328 (FIG. 13). The determination is made by comparing the first destination IP address with the URL/IPs of entries 1332(1)-(N) (FIG. 13) in the exclusionary content filter database 1330 (FIG. 13) of the filtering server.

If it is determined (1454-No) that the IP address is not on the list of URUIPs, the filtering server sends 1456 the packet on to the content server. The content server receives 1458 the packet and sends 1460 the requested content back to the IP device. The IP device receives the requested content and sends 1462 the content to the client computer that requested the content. The client computer receives and displays 1464 the content.

If it is determined (1454-Yes) that the IP address is on the list, then the filtering server compares 1466 the bogus IP address (indicating a filtering privilege) with the filter category associated with the URL/IP in the exclusionary content filter database 1330 (FIG. 13). In a preferred embodiment, the bogus IP address and the filter category are both 32 bits long. For an AND operation that ANDs two bits with the same bit location together, the result is 1 if both of the bits have a value of 1, and the result is 0 if one or both of the bits have a value of 0, at that bit location. Accordingly, a logical bit-wise AND operation, or some other comparing operation, may be used to determine at each bit location whether the bits of the bogus IP address correspond to a filtering category that is represented in the associated filter category of the URL/IP that matches the first destination IP address. This AND operation can be illustrated by, for simplicity, using 4 bits in the following 3 examples:

| Example Number | Bogus IP Address | | Filtering Category | | Result |
|---|---|---|---|---|---|
| 1 | 1000 | AND | 1001 | = | 1000 |
| 2 | 1000 | AND | 0111 | = | 0000 |
| 3 | 1000 | AND | 0000 | = | 0000 |

In each example, the bogus IP address associated with the request has the first bit location set to "1". For the purposes of this example, a "1" means the filtering category associated with this bit location is applicable (i.e., the request should be blocked based upon this category). A "0", on the other hand, means the filtering category associated with the bit location is not applicable (i.e., the request should not be blocked based upon this category).

In Example 1, categories 1 and 4 (as indicated by the "1" in the first and fourth bit locations) are the filtering categories associated with the URL/IP in the exclusionary content filter database 1330 (FIG. 13) that matches the first IP address. The filtering privilege for the user requesting the content is for category 1 (as indicated by the '1' in the first bit location). ANDing the filtering privilege and the filtering category together shows that the content should be filtered based upon category 1. For instance, if category 1 is pornography, category 2 is religion, category 3 is hate, and category 4 is violence, the filtering privileges indicated by the bogus IP address of 1000 would be for religion (category 2), hate (category 3) and violence (category 4), but not for pornography (category 1). The filtering category 1001 means that the content server contains content that has been categorized as pornographic (category 1) and violent (category 4). Though the filtering privileges include violence, they do not include pornography. Accordingly, as is illustrated by the result of 1000, the content for this site is blocked because it has been determined to contain pornography (category 1).

In Example 2, the filtering categories (0111) are categories 2, 3, and 4. In this case, as is appropriate since the filtering privilege (1000) only disallows category 1, ANDing the filtering privilege and filtering category shows that the content should not be filtered (0000). Thus, if the filtering privileges allow access to religion (category 2), hate (category 3), and violence (category 4), but not pornography (category 1), then access to content that has been determined to contain religion, hate, and violence would not be blocked.

In Example 3, the filtering categories (0000) indicate that the content is not blocked, regardless of filtering privilege. As expected, ANDing the filtering privilege and filtering category shows (0000) that the content should not be filtered, regardless of the filtering privilege.

In this manner, or by some other comparing operation, the filtering server determines 1468 whether at least one of these filtering categories matches a filtering category associated with the URL in the exclusionary content filter database 1330 (FIG. 13). If there is no match (1468-No), the filtering server sends 1456 the packet to the content server. The content server receives 1458 the packet and sends 1460 the requested content back to the IP device. The IP device receives the requested content and sends 1462 the content to the client computer that requested the content. The client computer receives and displays 1464 the content.

If, on the other hand, the filtering server determines that there is a match (1468-Yes), the request for content is blocked 1470. Preferably the server will send 1472 an authorization request to the client computer, including a notification that the request was blocked. In another embodiment, when the request is blocked 1470, the server may simply dump or discard the request (e.g., the packet could be routed to an output port that is not connected to anything). In an alternative embodiment, the packet may be redirected to an alternate server, which receives the packet and sends other content towards the IP device, such as a "blocked content" page.

In the preferred embodiment, the IP device forwards 1474 the authorization request to the client computer, which receives 1476 the authorization request. The user may be prompted to enter, for example, a username and password at the client computer. The username and password serve as authorization. The client computer preferably sends 1478 a packet containing a request (preferably the original request for content) along with the authorization. The IP device receives 1480 the packet with authorization. The authentication procedures 1118 determine if the filtering database 1128 may be updated by comparing the username and password to values in the user database 1132. If the username and password are in the user database 1132, the authentication procedures 1118 update 1482 the policy and privilege in the filtering database 1128 associated with the IP address of the requesting client computer with the policy and privilege values in the user database 1132 that are associated with the username and password. This is similar to when a user logs in (described previously). Once the filtering database has been updated, the IP device determines 1431 filtering privileges and continues as previously described. Alternatively, the updating 1482 sets filtering to inactive for that user and the packet is routed as requested.

In another embodiment, the packet can be sent to the service provider, which, in turn, can send a message to the client computer that made the request, informing the user that the requested content has been blocked or filtered. Or the service provider could send the authentication message to the user.

Figure 15:
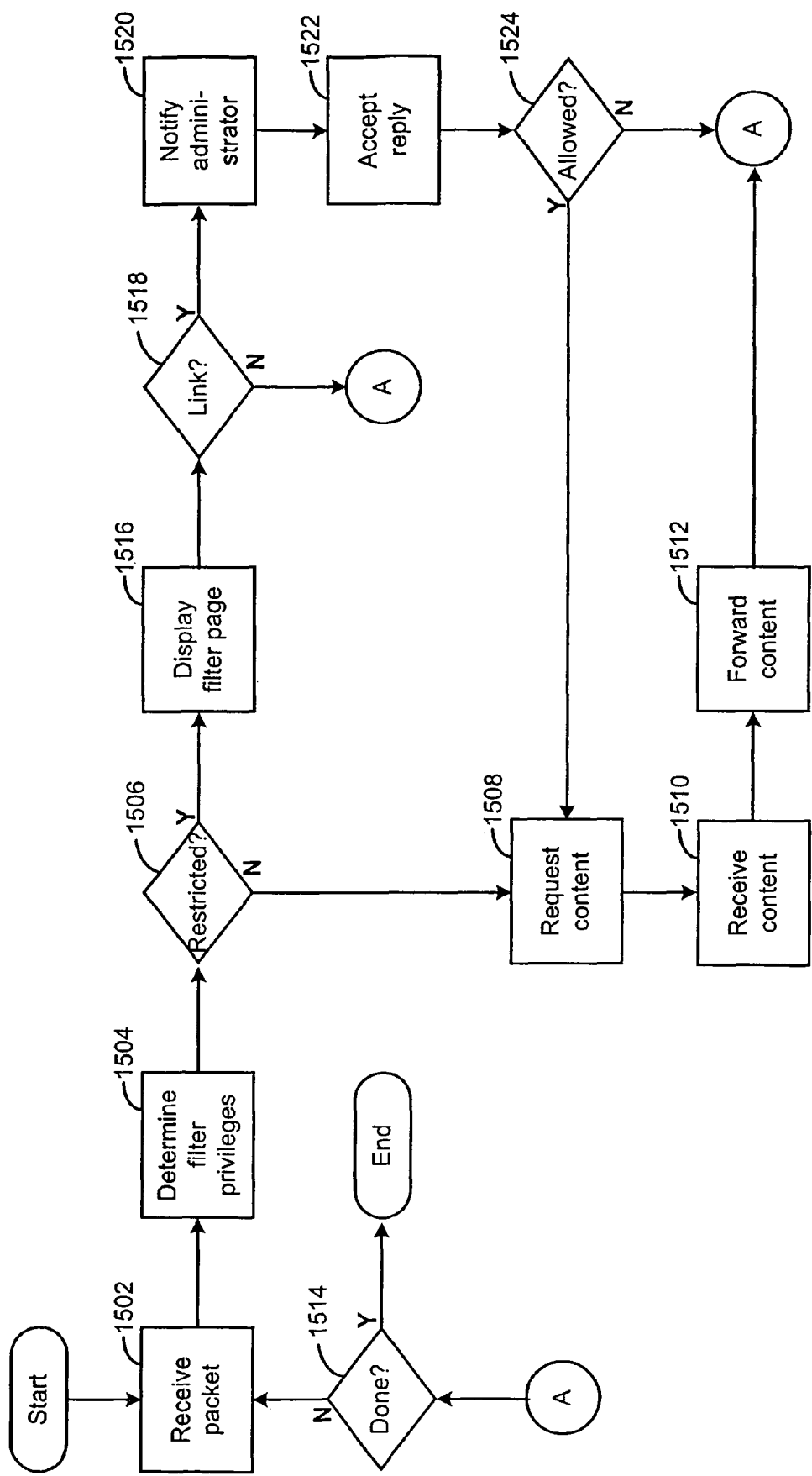
FIG. 15 is a flow chart of a method for providing access by an administrator for a user who is denied based on filtering privileges.

FIG. 15 illustrates a method for providing access by an administrator for a user who is denied content based on the user's filtering privileges. An IP device first receives 1502 a packet containing a request for content. The IP device determines 1504 the filtering privileges for the user in a manner described above. Using the techniques described above, it is determined 1506 whether the requested content is restricted. If the content is not restricted (1506-N), the IP device requests 1508 the content from the content provider, receives 1510 the content from the content provider, and forwards 1512 the content to the user. If the user is done (1514-Y), the process ends, otherwise (1514-N) the process continues at step 1502.

If the content is restricted (1506-Y), then the IP device transmits a filter page for display 1516 to the user. The filter page preferably includes a link to an administrator with full filtering privileges, or at least more filtering privileges than the user has. The link is preferably an email link, but could be any type of link. In an alternative, instead of a link, text is provided. The text could be a phone number or the name of one or more administrators. An administrator may be a parent and the user a child. Or the administrator could be a librarian and the user a patron of the library. If the user does not follow the link (1518-N), the process continues at step 1514. Otherwise (1518-Y), the IP device (or the user) notify 1520 the administrator that access has been denied for the user. The notification preferably includes a message explaining that access was denied and that the user desires access. The notification may also include a link that, when clicked, quickly generates a response with permission to obtain the requested content. When the IP device accepts 1522 the administrator's reply, the IP device determines 1524 whether access is now allowed, based upon the administrator's filtering privileges. If access is no longer restricted (1524-Y), the process continues at step 1508. Otherwise (1524-N) the process continues at step 1514.

While the foregoing description and drawings represent the preferred embodiment of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A method for filtering content, comprising:
receiving at an IP device of a service provider a packet from a client computer containing a request for content from a server, where the packet comprises a user identifier for a user;
determining filtering privileges for the user based upon the user identifier at the IP device;
denying the request for the content based upon the filtering privileges of the user and an IP address of the server;
displaying a filtering page at the client computer, wherein the filtering page includes one of a first link and text, and wherein the first link is to an administrator device, wherein the text identifies the administrator device, and wherein the administrator device is a client device authorized to receive the content from the IP device;
transmitting a notification message to the administrator device based on the one of the first link and the text, wherein the notification message includes a second link to the IP device and indicates the denied request;
generating a permission reply at the administrator device based on the second link in the notification message, wherein the permission reply indicates that access to the content is permitted for the client computer;
receiving the permission reply from the administrator device at the IP device;
accepting the permission reply at the IP device; and
providing content from the server to the client computer through the IP device in response to the accepting of the permission reply.

2. A method as recited in claim 1 wherein the administrator device has filtering privileges greater than the filtering privileges for the user.

3. A method as recited in claim 2 wherein the providing of the content comprises providing the content based upon the filtering privileges of the administrator device.

4. A method as recited in claim 1 wherein the first link comprises an email address of the administration device.

5. A method as recited in claim 1 further comprising selecting the first link at the client computer,
wherein the transmitting of the notification signal comprises emailing the administrator device based on the first link of the denied request.

6. A method as recited in claim 1 wherein the administrator device is distinct from the client computer and the IP device.

7. A method as recited in claim 1 wherein the first link is from the client computer to the administrator device.

8. A method as recited in claim 1 wherein the notification message is transmitted from the client computer to the administrator device.

9. A method as recited in claim 1 wherein:
the client computer is a child device; and
the administrator device is a parent device.

10. A method as recited in claim 1 wherein:
the administrator device is a librarian device of a library; and
the client computer is a device of a patron of the library.

11. A method as recited in claim 1 wherein the notification message comprises a message indicating that:
the request for content is denied; and
the client computer is requesting access to the content.

12. A method as recited in claim 1 further comprising:
determining whether access to the content is permitted for the client computer based upon filtering privileges of the administrator device; and
providing the content from the server via the IP device to the client computer according to the filtering privileges.

13. A method as recited in claim 12 wherein the determining of whether access to the content is permitted for the client computer based upon the filtering privileges is performed:
subsequent to the receiving of the permission reply at the IP device; and
prior to the providing of the content from the server to the client computer.

* * * * *